United States Patent [19]

Fanelli et al.

[11] Patent Number: 4,478,987
[45] Date of Patent: Oct. 23, 1984

[54] ALUMINA-BASED AEROGEL SUPPORTED TRANSITION METAL CATALYST USEFUL AS A ZIEGLER-NATTA OLEFIN POLYMERIZATION CATALYST AND PROCESS FOR PREPARING SAME

[75] Inventors: Anthony J. Fanelli, Rockaway; Alson K. Price, Chester, both of N.J.

[73] Assignee: Allied Corporation, Morris Township, Morris County, N.J.

[21] Appl. No.: 422,928

[22] Filed: Sep. 24, 1982

[51] Int. Cl.³ ............................ C08F 4/02; C08F 10/02
[52] U.S. Cl. ...................................... 526/97; 502/132; 526/121; 526/124; 526/156; 526/129; 526/352
[58] Field of Search ................. 526/97, 121, 124, 156, 526/129

[56] References Cited

U.S. PATENT DOCUMENTS

| | | | |
|---|---|---|---|
| 3,506,633 | 4/1970 | Matsuura et al. | 526/156 |
| 3,513,150 | 5/1970 | Matsuura et al. | 526/156 |
| 3,705,886 | 12/1972 | Kashiwa et al. | 526/156 |
| 3,936,431 | 2/1976 | Deginato et al. | 526/156 |
| 3,963,646 | 6/1976 | Teichner et al. | 252/459 |
| 3,978,031 | 8/1976 | Deginato et al. | 526/156 |
| 4,018,672 | 4/1977 | Moser | 208/216 |
| 4,088,812 | 5/1978 | Matuura et al. | 526/121 |
| 4,120,943 | 10/1978 | Iwaisoko et al. | 423/630 |
| 4,247,669 | 1/1981 | Deginato et al. | 526/156 |

OTHER PUBLICATIONS

Kistler, (J. Phys. Chem., 36 (1932) 52-64), "Coherent Expanded Aerogels".
S. J. Teichner et al., "*Inorganic Oxide Aerogels*" in *Advances in Colloid and Interface Science,* vol. 5, 1976, 245-273.
M. Astier et al., in *Preparation of Catalysts,* edited by B. Delmor et al., Elsevier Scientific Publishing Company, (1976), Amseterdam, at pp. 315-328.
*Encyclopedia of Polymer Science and Technology,* vol. 4, at pp. 137-150, (1971), J. Wiley & Sons, Inc., "Coordinate Polymerization".
*Encyclopedia of Polymer Science and Technology,* vol. 13, at pp. 13-122, "Stereoregular Linear Polymers".
*Encyclopedia of Polymer Science and Technology,* vol. 15, at p. 133, "Ziegler-Natta Catalysts".

*Primary Examiner*—Edward J. Smith
*Attorney, Agent, or Firm*—Gus T. Hampilos; Gerhard H. Fuchs; Thomas D. Hoffman

[57] ABSTRACT

A new polymerization catalyst system comprising an aluminum compound and a transition metal compound on an alumina-based aerogel support, a process for preparing the polymerization catalyst system and use of the catalyst system for polymerization and copolymerization of alpha-olefins are disclosed. A heat-activated alumina-based aerogel useful as a catalyst support and having a morphology by transmission electron microcopy comprising extremely thin folded film-like ribbons or plates and having a high BET surface area, high pore volume, and low bulk density is also disclosed.

16 Claims, 26 Drawing Figures

ALUMINA-BASED AEROGEL PREPS

ALUMINA-BASED AEROGEL PREPS

ALUMINA-BASED AEROGEL PREPS

ALUMINA-BASED AEROGEL PREPS

ALUMINA-BASED AEROGEL PREPS

ALUMINA-BASED AEROGEL SUPPORTED TRANSITION METAL CATALYST USEFUL AS A ZIEGLER-NATTA OLEFIN POLYMERIZATION CATALYST AND PROCESS FOR PREPARING SAME

BACKGROUND OF THE INVENTION

This invention relates to a new polymerization catalyst system comprising an aluminum compound and a transition metal compound on an alumina-based aerogel support, a process for preparing the polymerization catalyst system and use of the polymerization catalyst system for polymerization and copolymerization of alpha-olefins. Another aspect of this invention relates to a heat-activated alumina-based aerogel useful as a catalyst support and have a morphology by transmission electron microscopy comprising film, platelets and needles and substantially free of spherical particles and having a high BET surface area, high pore volume, and low bulk density.

It is well known that alpha-olefins may be polymerized and copolymerized in the presence of a Ziegler-Natta type catalyst comprising Group III metal compound such as $Al(C_2H_5)_3$ and a transition metal compound such as titanium tetrachloride on an inorganic oxide support such as alumina, silica, titania, magnesia, etc. The polymerization reaction may be carried out in suspension, in solution or even in the gas phase. (See, for example, Professor Natta's article in *Encyclopedia of Polymer Science and Technology*, Volume 4, at pages 137 to 150, (1971) J. Wiley & Sons, Inc., and articles in Volume 13, at pages 13 to 122 and Volume 15, at page 133 ibid.

U.S. Pat. No. 3,506,633 (Matuura, et al.) discloses a polymerization catalyst having a Cl/Ti ratio of 2.5 to 3.5 that is prepared by reacting $TiCl_4$ with a substantially amorphous alumina xerogel having a total pore volumn less than 0.7 $cm^3/g$.

U.S. Pat. No. 3,978,031 (Reginato, et al.) discloses a polymerization catalyst system containing an organometallic compound such as an alkyl aluminum compound and a co-catalyst formed by reacting a heat-activated halogenated alumina having an atomic ratio of halogen to aluminum of from 0.1 to 1, such as fluorinated alumina, and a transition metal compound such as $TiCl_4$.

U.S. Pat. No. 4,088,812 (Matuura, et al.) discloses preparation of an olefin polymerization catalyst by impregnating a titanium or a vanadium compound such as $TiCl_4$ onto a solid carrier formed by treatment with $SO_3$ of an oxide or mixture of oxides of Group II-IV metals such as alumina.

U.S. Pat. No. 4,247,669 (Reginato, et al.) discloses an olefin polymerization catalyst system containing an organo-metallic compound such as trialkyl aluminum and a supported catalyst prepared by reaction of a halogen-containing transition metal compound such as $TiCl_4$ with a heat-activated alumina having an internal pore volume greater than 0.8 $cm^3/g$ so that the ratio of halogen to transition metal in the supported catalyst is greater than that of the halogen-containing compound.

All of the above-mentioned U.S. patents disclose polymerization catalysts that are characterized by relatively low productivity in the low pressure (<1000 psi) polymerization of ethylene. In commercial production of ethylene, the use of catalysts having a high productivity (which is a measure of the grams of polymer produced per gram of catalyst per hour) is frequently the difference between making an acceptable or a non-acceptable product. The higher the catalyst productivity, the lower the concentration of catalyst remaining in the polymer. Very low concentrations of catalyst residue in the polymer are innocuous and, consequently, need not be removed by expensive de-ashing procedures. For this reason, the polyolefin industry has ongoing research efforts on developing polymerization catalysts having high productivity for the low pressure polymerization of ethylene.

An inorganic hydrated oxide, precipitated from an aqueous solution of the corresponding metal cation washed and then dried in an oven (in air or in vacuum) is very often obtained in a divided state as a porous gel. The general name of xerogel is given to these materials by A. Freundlich (*Colloid and Capillary Chemistry*), Duttom, N.Y. 1923). However, the texturial characteristics (pore volume and surface area) of the xerogel is considerably poorer than that of the wet gel before the elimination of the solvent (water). It is theorized that the evaporation of the solvent creates a vapor-liquid interface inside the pores and that the surface tension of the solvent is responsible for a partial collapse of the pore structure. In order to eliminate the liquid-vapor interface inside the pores, Kistler (J. Phys. Chem., 36 (1932) 52) disclosed an efficient process of evacuating the solvent from the system under supercritical conditions in an autoclave. The general name of aerogel is given to solids dried in this way. S. J. Teichner et al. (article entitled "Inorganic Oxide Aerogels" in *Advances in Colloid and Interface Science*, Volume 5, 1976) 245-273) disclosed a general method for preparation of inorganic oxide aerogels such as $SiO_2, Al_2O_3, TiO_2, ZrO_2, MgO$ and mixed inorganic oxides by dissolving in an organic solvent such as alcohol or benzene the corresponding alcoholate of the metal, hydrolyzing same at room temperature and evacuating the solvent under super-critical conditions in an autoclave. The method disclosed by Teichner is simpler than the complicated method of Kistler in that the hydrolysis reaction is carried out directly in an organic medium such as alcohol or benzene and there is no need for the substitution of an organic solvent for the initial aqueous medium which was previously used in the preparation of aerogels. U.S. Pat. No. 3,963,646 (Teichner et al.) disclosed preparation of $NiO-Al_2O_3$ aerogels useful as catalysts for the hydrogenation or the controlled oxidation of olefins. See also M. Astier et al. in *Preparation of Catalysts*, edited by B. Delmor et al., Elsevier Scientific Publishing Company (1976) Amsterdam, at pages 315 to 328.

U.S. Pat. No. 4,018,672 (Moser) discloses a hydrodesulfurization catalyst having an alumina-containing support prepared by a thermal decomposition of aluminum alcoholates in a manner analagous to that disclosed by Teichner et al.

SUMMARY OF THE INVENTION

In accordance with the present invention, there is provided a process for the polymerization and copolymerization of alpha-olefins which comprises contacting an alpha-olefin at a temperature and at a pressure sufficient to initiate the polymerization and copolymerization with a catalytic amount of (a) a di($C_1$–$C_{18}$alkyl)aluminum chlorocompound or a tri($C_1$–$C_{18}$alkyl)aluminum compound; and (b) a catalyst produced by the reaction of a transition metal compound formed from a member selected from the group consisting of titanium, vanadium, hafnium, and zirconium, and members selected from the group consisting of chlorides, oxychlorides, alkoxychlorides and oxyalkoxychlorides with a heat-activated alumina-based aerogel having a bulk density less than about 0.10 g/cm$^3$, a BET surface area greater than about 300$^2$m/g and a pore volume greater than about 3 cm$^3$/g and obtained by heating an alumina-based aerogel having a carbon content at a temperature of at least about 400° C., in the presence of oxygen, for a time sufficient to produce said heat-activated alumina-based aerogel substantially free of carbon; said alumina-based aerogel being prepared by venting a $C_1$–$C_5$ alcohol or mixture of same, under super-critical conditions, from a mixture comprising a hydrolyzable aluminum compound, water, and a $C_1$–$C_5$ alcohol or mixture of same. This polymerization process may be operated effectively to produce polyethylene over a broad range of temperatures and pressures and in the presence and in the absence of hydrogen gas. When hydrogen is present, the ratio of the pressure of hydrogen to ethylene may be varied over the range of about 0.5:1 to 5:1.

In another aspect of the present invention, there is provided a method of preparing a catalyst system for polymerization and copolymerization of alpha-olefins which comprises:

(a) forming a solution or a suspension comprising an alcohol or mixture of alcohols selected from $C_1$ to $C_5$ alcohols and a hydrolyzable aluminum compound and at least about a stoichiometric amount of water required to hydrolyze said hydrolyzable aluminum compound;

(b) heating a suspension comprising the hydrolyzed and hydrolyzable aluminum compound in the presence of a solvent comprising methanol to a temperature above the critical temperature of the solvent comprising methanol;

(c) removing the solvent comprising methanol under super-critical conditions to form an alumina-based aerogel having a carbon content;

(d) heating the carbon-containing alumina-based aerogel in the presence of an oxygen-containing gas stream at a temperature of at least about 400° C. for a time sufficient to form a heat-activated alumina-based aerogel substantially free of carbon; and (e) reacting said heat-activated aerogel under substantially anhydrous conditions with a transition metal compound formed from a member selected from the group consisting of titanium, vanadium, hafnium and zirconium, and members selected from the group consisting of chlorides, oxychlorides, alkoxychlorides and oxyalkoxychlorides with said heat-activated aerogel to form a catalyst system having a BET surface area greater than about 300 m$^2$/g, a pore volume greater than about 3.0 cm$^3$/g, a bulk density less than about 0.1 g/cm$^3$.

In one aspect of this invention, a catalyst system comprising TiCl$_4$ impregnated on a heat-activited alumina-based aerogel formed by super-critical venting of methanol from a reaction mixture prepared from a suspension of aluminum isopropoxide and, at least about a stoichiometric amount of water (about 3:1 molar ratio of H$_2$O:Al) in methanol is provided. A preferred embodiment of the present catalyst system comprising TiCl$_4$ impregnated on heat-activated alumina aerogel in combination with an organo-aluminum compound effects polymerization of ethylene at hourly productivities of 3000 g of polyethylene/g of catalyst/hr/ and produces polyethylene having values of about 8–12 for high load melt index (I$_{22}$) at H$_2$/C$_2$H$_4$ ratios less than 1.

In still another aspect of the present invention, there is provided a catalyst system for the polymerization and the copolymerization of alpha-olefins comprising a di($C_1$–$C_{18}$alkyl)chloroaluminum compound or tri($C_1$–$C_{18}$alkyl)aluminum compound and a catalyst comprising the reaction product of a transition metal compound formed from a member selected from the group consisting of titanium, vanadium, hafnium and zirconium and members selected from the group of chlorides, oxychlorides, alkoxychlorides, and oxyalkoxychlorides with a heat-activated alumina-based aerogel having a BET surface area greater than about 300 m$^2$/g, a pore volume greater than about 3 cm$^3$/g, a bulk density less than about 0.1 g/cm$^3$.

Further, there is provided a heat-activated alumina-based aerogel having a morphology by transmission electron microscopy comprising extremely thin, film-like ribbons and plates, said ribbons and plates being folded upon themselves or twisted around one another and rolled up into scrolls or mixtures of spherical particles and said thin, film-like ribbons and plates, a BET surface area greater than about 300 m$^2$/g, a pore volume greater than about 3 cm$^3$/g and a bulk density less than about 0.1 g/cm$^3$.

Finally there is provided a process for preparing a heat-activated alumina-based aerogel which comprises the steps of:

(a) forming a solution or a suspension comprising an alcohol or mixture of alcohols selected from $C_1$ to $C_5$ alcohols and a hydrolyzable aluminum compound and at least about a stoichiometric amount of water required to hydrolyze said compound;

(b) heating a suspension comprising the hydrolyzed and hydrolyzable aluminum compound in the presence of a solvent comprising methanol to a temperature above the critical temperature of the solvent comprising methanol;

(c) removing the solvent comprising methanol under supercritical conditions to form an alumina-based aerogel; and (d) heating the carbon-containing alumina-based aerogel in the presence of an oxygen-containing gas stream at a temperature of at least about 400° C. for a time sufficient to form a heat-activated alumina-based aerogel substantially free of carbon.

DETAILED DESCRIPTION OF THE INVENTION

Figure 1:
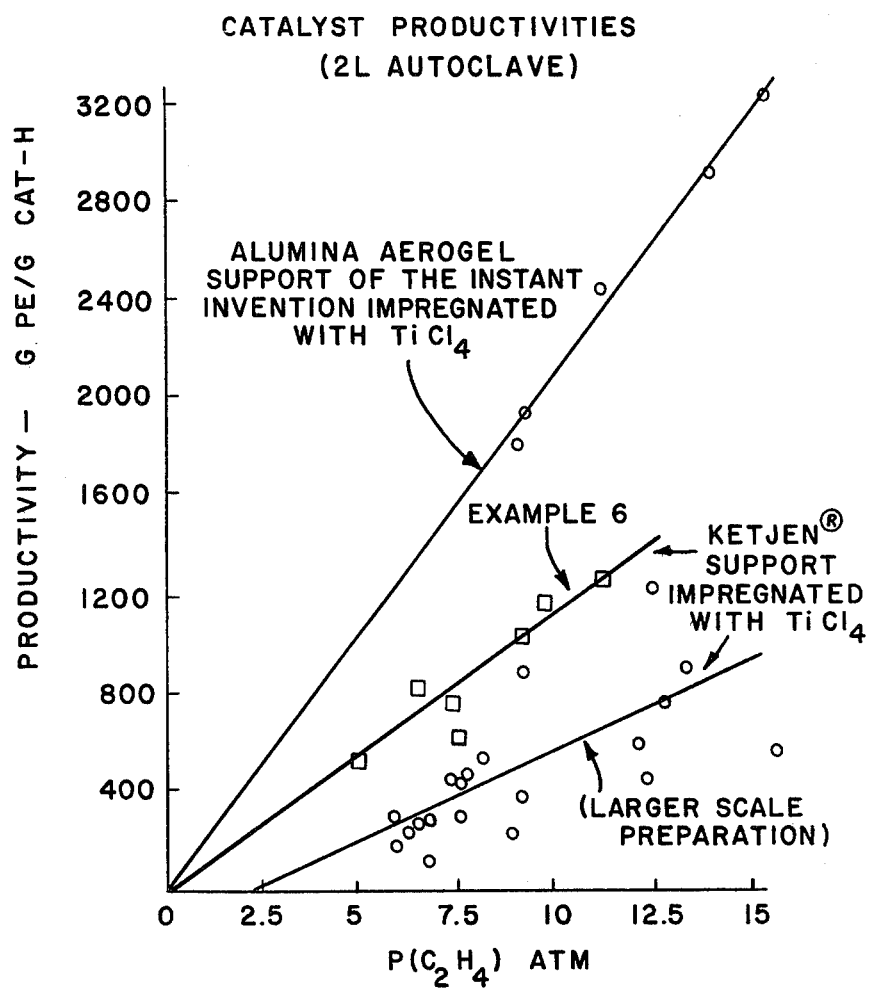
FIG. 1 graphically compares the productivities in ethylene polymerizaton reactions for a catalyst system comprising TiCl$_4$ on a heat-activated alumina-based aerogel of the present invention with those for samples of certain prior art catalysts.

The present invention employs a new Ziegler-Natta catalyst system based on heat-activated alumina-based aerogel carriers useful for low pressure polymerization and copolymerization of alpha-olefins, such as ethylene. Hourly productivity rates above about 3,000 grams of polyethylene (PE) per gram of catalyst per hour have been obtained using preferred embodiments of the alumina-based aerogel supports of the present invention. Furthermore, the new alumina-based aerogel catalysts of the present invention effect high pressure polymerization of ethylene in the presence of hydrogen with a significant cost savings in that the loss of ethylene by hydrogen reduction to ethane can be reduced by about one-half compared to the ethylene polymerizations effected by certain prior art catalysts. These economically advantageous results of higher hourly productivity and lower ethylene loss by reduction have been achieved by employing a catalyst system comprising an organo-aluminum compound and a catalyst produced by impregnating a transition metal compound such as $TiCl_4$ onto heat-activated alumina-based aerogel carriers that, unlike prior art carriers, do not require pretreatment of carriers with fluoride or other chemical reagents such as $SO_3$.

The present invention may be fully understood by a discussion of (1) preparation of the catalyst by reaction of a transition metal compound and the heat-activated alumina-based aerogel carrier (2) preparation of the catalyst system which comprises an organo-aluminum compound and a catalyst produced by reaction of a transition metal compound with a heat-activated alumina-based aerogel carrier, and (3) the polymerization and copolymerization of alpha-olefins by contacting the monomer with a catalytic amount of the catalyst system at a temperature and a pressure sufficient to initiate polymerization and copolymerization.

1. Preparation of the Supported Catalyst (a) Heat Activated Alumina-Based Aerogel Carriers. By the term "alumina-based aerogel" as used herein is meant an aerogel comprising mixed metal oxides of at least about 65 weight percent of aluminum oxide and up to about 35 weight percent of at least one of the oxides selected from the group consisting of calcium oxide, barium oxide, magnesium oxide, cerium oxide, lanthanum oxide, titanium oxide, zirconium oxide, chromium oxide, zinc oxide, gallium oxide, silica and antimony oxide.

The present invention relates to catalyst comprising heat-activated alumina-based aerogels found useful as carriers for transition metal compounds to produce catalyst systems useful for polymerization and copolymerization. Hourly productivities above about 3,000 gPE/g-cat-h. have been achieved with preferred embodiments of the alumina-based aerogels of the present invention. Based on comparative test data, the heat-activated alumina-based aerogel carriers of the present invention are largely responsible for the desirable results achieved in the polymerization and copolymerization of alpha-olefins. The heat-activated alumina-based aerogel carriers of the present invention are prepared by (a) forming a solution or a suspension comprising a $C_1-C_5$ alcohol or mixture of same and a hydrolyzable aluminum compound and at least about a stoichiometric amount of water required to hydrolyze said aluminum compound; (b) heating the suspension or solution so formed in the presence of a $C_1-C_5$ alcohol or mixture of same to a temperature above the critical temperature of said alcohol or mixture of same, and (c) removing said alcohol or mixture of same under supercritical conditions to form an aerogel having a carbon content greater than about 1 weight percent carbon.

The $C_1-C_5$ alcohols found useful in the process of forming the carriers of the present invention are methanol, ethanol, isopropanol, n-propanol, sec-butanol, etc. or mixtures thereof. Methanol is a preferred alcohol.

The hydrolyzable aluminum compounds found useful in the process of forming alumina-based aerogel carriers of the present invention are aluminum alkoxides, preferably secondary alkoxides having 3 to 5 carbon atoms.

By the term "stoichiometric amount of water" is meant a molar ratio of water to hydrolyzable aluminum compound of at least about 3:1.

The temperature and pressure for the supercritical venting of the solvent alcohol or mixture of alcohols is dependent upon the exact alcohol or mixture of alcohols used.

To insure that super-critical conditions are maintained during the venting step, it has been found convenient to heat the autoclave containing hydrolyzed aluminum compound and said alcohol or mixture of same to a temperature of at least about 20° C. above the supercritical temperature.

FIGS. 4(A-E) graphically illustrate five possible preparations of alumina-based aerogel useful as carriers. The five variations may be designated as methods 4A, 4B, 4C, 4D and 4E. FIG. 4A illustrates an aspect of the preparation of alumina aerogel carriers of the present invention. A dispersion of an aluminum alkoxide, such as aluminum isopropoxide in methanol is mixed with at least about a stoichiometric amount of water required to hydrolyze the aluminum compound, employing mild agitation and heated at elevated temperatures, e.g., 50°-70° C., for a time sufficient to precipitate the aluminum hydroxide. The mixture is heated in an autoclave to a temperature at least about 20° above the supercritical temperature of methanol. The methanol is vented while the temperature of the contents of the autoclave is maintained above the critical temperature of methanol and there is recovered an alumina aerogel having a carbon content of at least about 1 weight percent carbon.

Figure 4A:
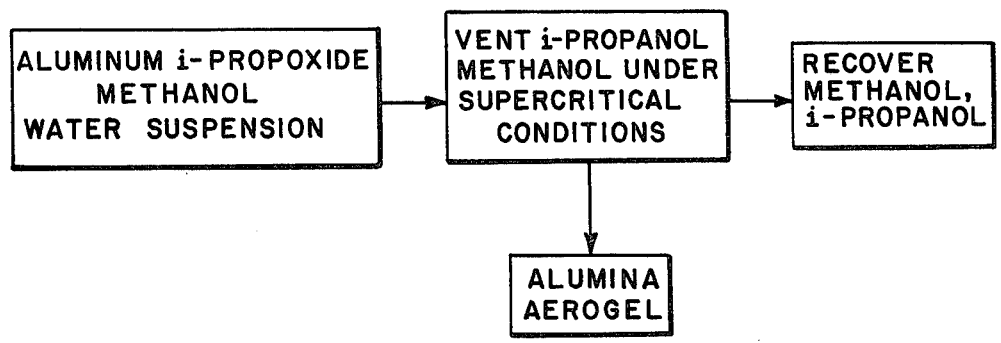
FIGS. 4(A-E) schematically illustrates processes for preparation of alumina-based aerogels of the present invention.
Figure 4B:
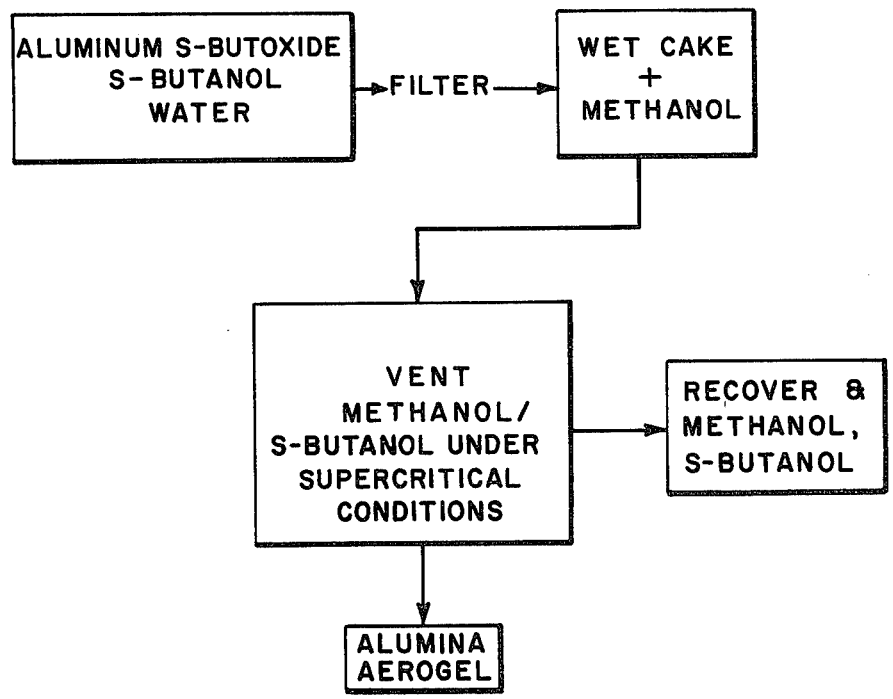

See FIG. 4B wherein another example of a method of preparation of alumina-based aerogels is illustrated. A solution of aluminum secondary butoxide and secondary butanol in water is formed at ambient temperture and heated at elevated temperatures, e.g., 75°-80° C. for a time sufficient to precipitate aluminum hydroxide. The precipitate is filtered to separate secondary butanol and a wet cake of aluminum hydroxide and residual sec-butanol which is dispersed in methanol and placed in an autoclave. The methanol dispersion is heated at a temperature sufficient to produce the super-critical conditions for methanol/secbutanol solvent mixture which is vented and an alumina aerogel having a carbon content of at least about 1 weight percent carbon is obtained.

Figure 4C:
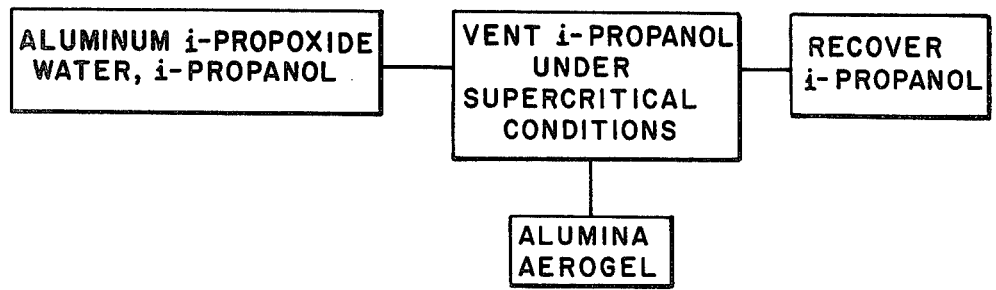
Figure 4D:
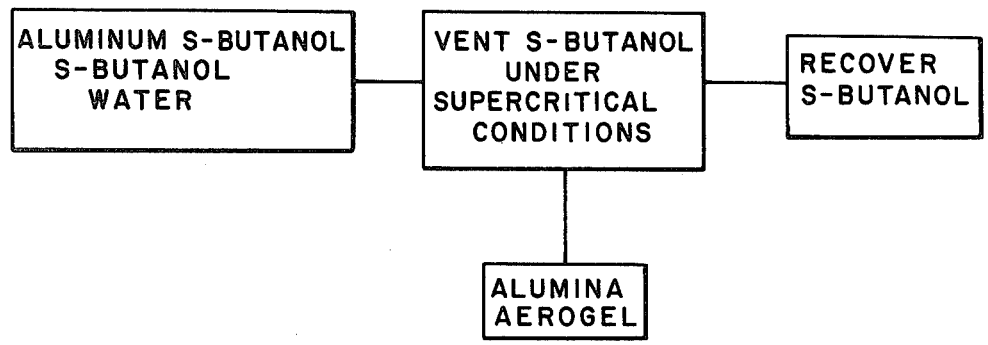

FIG. 4C illustrates still another method of preparation wherein, for example, a solution of aluminum isopropoxide is isopropanol is mixed with at least about a stoichiometric amount of water at elevated temperatures, e.g., 75°-80° C., for a time sufficient to produce a precipitate of aluminum hydroxide in isopropanol. The reaction mixture is heated in an autoclave to a temperature at least about 20° C. above the supercritical temperature for isopropanol. The isopropanol solvent is vented at supercritical conditions of temperature and pressure and an alumina aerogel is recovered having a carbon content of at least about 1 weight percent carbon.

Figure 4E:
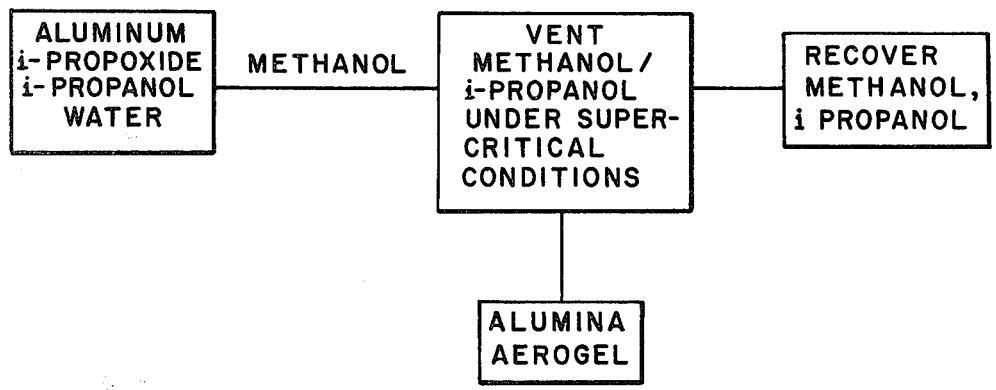

FIG. 4E illustrates a preferred method of preparation of alumina-based aerogels of the present invention, wherein aluminum isopropoxide is dissolved in sufficient isopropanol to form a completely homogeneous solution at elevated temperatures, and at least a stoichiometric amount of water is added thereto, with mixing. Heating is continued for a time sufficient to produce a precipitate of aluminum hydroxide in isopropanol. The heterogeneous reaction mixture is transferred (without filtration) to an autoclave. The temperature of the contents of the autoclave is raised to a value of at least about 20° C. above the critical temperature for the isopropanol-methanol solvent mixture which is then vented and the alumina-based aerogel is recovered. The preferred method of FIG. 4E operates without the additional step of filtration of the wet cake of Al(OH)$_3$ to produce an alumina-based aerogel, even though the aluminum isopropoxide may be partially hydrolyzed, i.e., Al(OH)(i-C$_3$H$_7$O)$_2$. After the hydrolysis step but before the venting step of FIG. 4E, methanol may be added. The solvent composition, in weight %, may thereby be varied from about 100% isopropanol up to about 80% methanol-20% isopropanol, preferably, from about 80% isopropanol-20% methanol to about 20% isopropanol-80% methanol.

The alumina-based aerogels prepared in accordance with the procedures illustrated in FIGS. 4(A-E) are calcined (heat-activated) at a temperature of at least about 400° C., in the presence of an oxygen-containing gas, such as air or oxygen gas, for a time sufficient to produce a heat-activated alumina-based aerogel substantially free of carbon, i.e., having a carbon content of less than about 0.2 weight percent carbon. The calcination temperature found useful to accomplish preparing the alumina-based aerogels of the present invention is in the range of about 400° to no more than 700° C.; a temperature of about 700° C. has been found convenient to produce the heat-activated alumina-based aerogel useful as a catalyst in the present invention.

Surprisingly, the presence of methanol in the heterogeneous reaction mixture in the autoclave during the venting step has been found to have a beneficial effect on the hourly productivity of the polymerization catalyst derived from alumina-based aerogel supports produced in accordance with the preferred embodiments of the method illustrated in FIG. 4E. The Table below illustrates that the hourly productivity of preferred ethylene polymerization catalysts of the present invention (TiCl$_4$ impregnated on heat activated alumina-based aerogels) was increased as the weight percent of methanol in the solvent added to the heterogeneous reaction mixture in the autoclave prior to venting was increased from zero to 20 percent.

| Example No. | Solvent Composition of Autoclave Prior to Venting (wgt. %) | | Hourly Productivity (g PE/g cat-h) |
| --- | --- | --- | --- |
| | i-propanol | methanol | |
| 11 | 100 | 0 | 1751 |
| 14d | 92 | 8 | 2327 |
| 14a | 80 | 20 | 2994 |

The carbon content of the alumina-based aerogel prior to calcination is preferably at least about 1 weight percent carbon, more preferably in the range of about 1 to about 8 weight percent carbon. While the preferred carbon content of the alumina-based aerogel prior to calcination is at least about 1 weight percent, and more preferably in the range of about 1 to about 8 percent carbon, in a preferred embodiment of the present invention, a surprisingly high hourly productivity of 2327 g PE/g cat-h was obtained in ethylene polymerization reaction wherein the catalyst was derived from an alumina-based aerogel having a carbon content of 0.61 weight percent prior to calcination (See Examples 5d and 14d). While alumina-based aerogels are calcined at a temperature of at least about 400° C., in the presence of an oxygen-containing gas, for a time sufficient to produce a heat-activated alumina-based aerogel substantially free of carbon, a carbon content of at least about 1 weight percent in the aluminabased aerogel prior to calcination has been found to be critical for production of a heat-activated aluminabased aerogel that is useful in the present invention, i.e., as a carrier for a transition metal compound such as TiCl$_4$.

The heat-activated alumina-based aerogel carriers found useful in the present invention are characterized as having bulk densities less than about 0.10 g/cm$^3$, BET surface areas greater than about 300 m$^2$/g and X-ray diffraction patterns indicating the presence of amorphous phases or crystalline phases and pore volumes greater than about 3 cm$^3$/g. Alumina-based aerogels having properties outside these limits, for example, those alumina-based aerogels having pore volumes less than 3 cm$^3$/g were found to be less effective carriers for TiCl$_4$ and are to be avoided.

The catalyst systems which operated with superior productivity in the polymerization of ethylene were derived from heat-activated alumina-based aerogels wherein methanol is employed for the supercritical venting operation of the procedure of FIGS. 4A, 4B, 4C and 4E. The highest hourly productivities in the polymerization of ethylene were obtained with a catalyst systems based on alumina-based aerogels prepared in accordance with the procedures of FIGS. 4A, 4B and 4E.

The preferred heat-activated alumina-based aerogels of the present invention prepared in accordance with the preferred embodiments of the methods illustrated in FIGS. 4A–4C and 4E have a morphology by transmission electron microscopy comprising extremely thin film-like ribbons and plates, some of said ribbons and plates being folded upon themselves and twisted around one another and others of said ribbons and plates being rolled up into scrolls or mixtures of spherical particles and said ribbons and plates, BET surface areas greater than about 300 cm$^2$/g, pore volumes greater than about 3 cm$^3$/g and bulk densities less than about 0.10 g/mL. While these unique aerogels have been prepared by the methods of the present invention, illustrated in FIGS. 4A–4C and 4E, it is believed that other methods may be employed to achieve these distinctive characteristics which are responsible for the high hourly productivity of the catalyst systems used to polymerize and copolymerize alpha-olefins.

FIGS. 5 to 12 illustrate transmission electron mirographs of the aerogels prepared in accordance with the preferred embodiments of the process of the present invention, the prior art, and nonvented materials called xerogels, i.e., materials prepared without removal of solvent under supercritical conditions.

Figure 5:
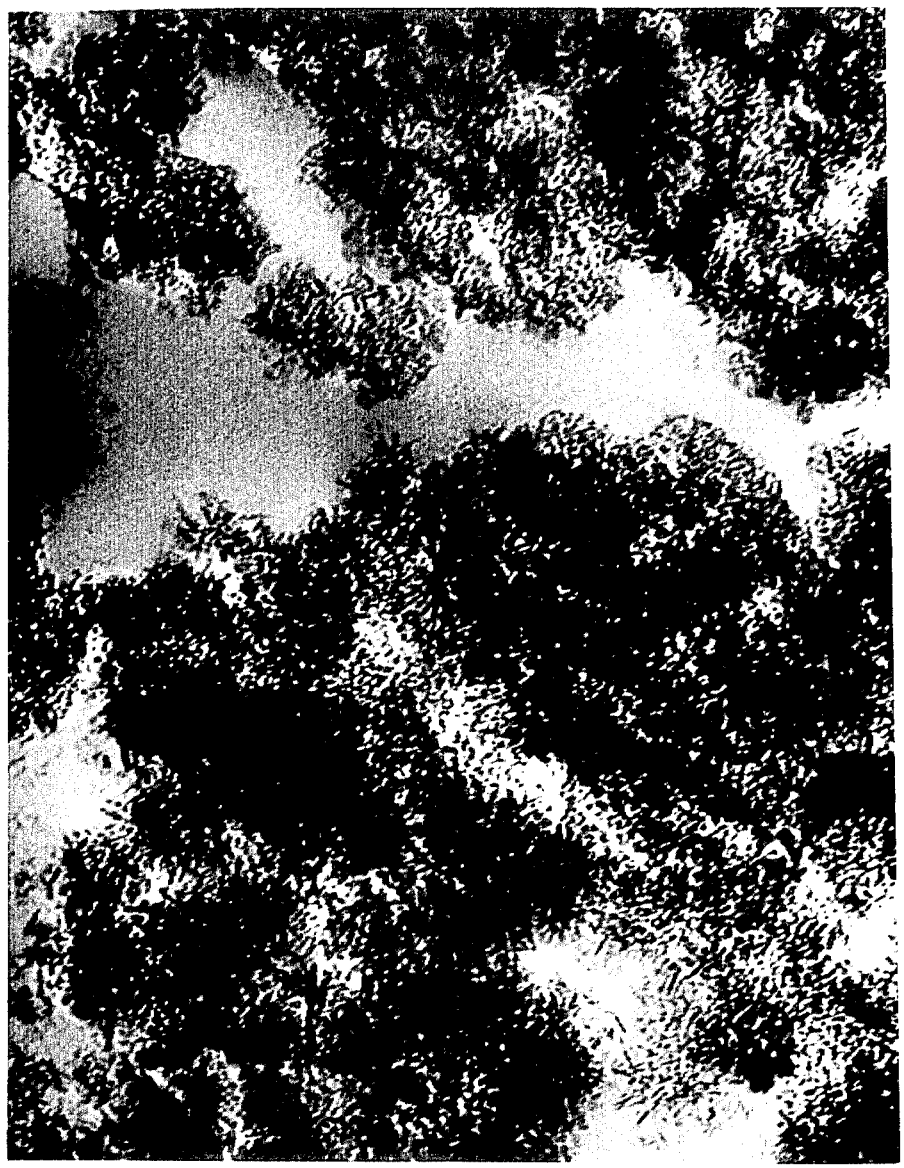
FIG. 5 is a transmission electron micrograph of KETJEN® NFF, a prior art fluorinated alumina support.

FIG. 5 shows that the morphology of KETJEN ® NFF, a fluorinated alumina, prepared as described in Example 6 hereinbelow, contains predominately spherical particles having a particle size (diameter) in the 40–70 Å range.

Figure 6A:
FIGS. 6a and 6b are transmission electron micrographs of an alumina aerogel support prepared in accordance with a preferred embodiment of the method illustrated in FIG. 4B.
Figure 6B:
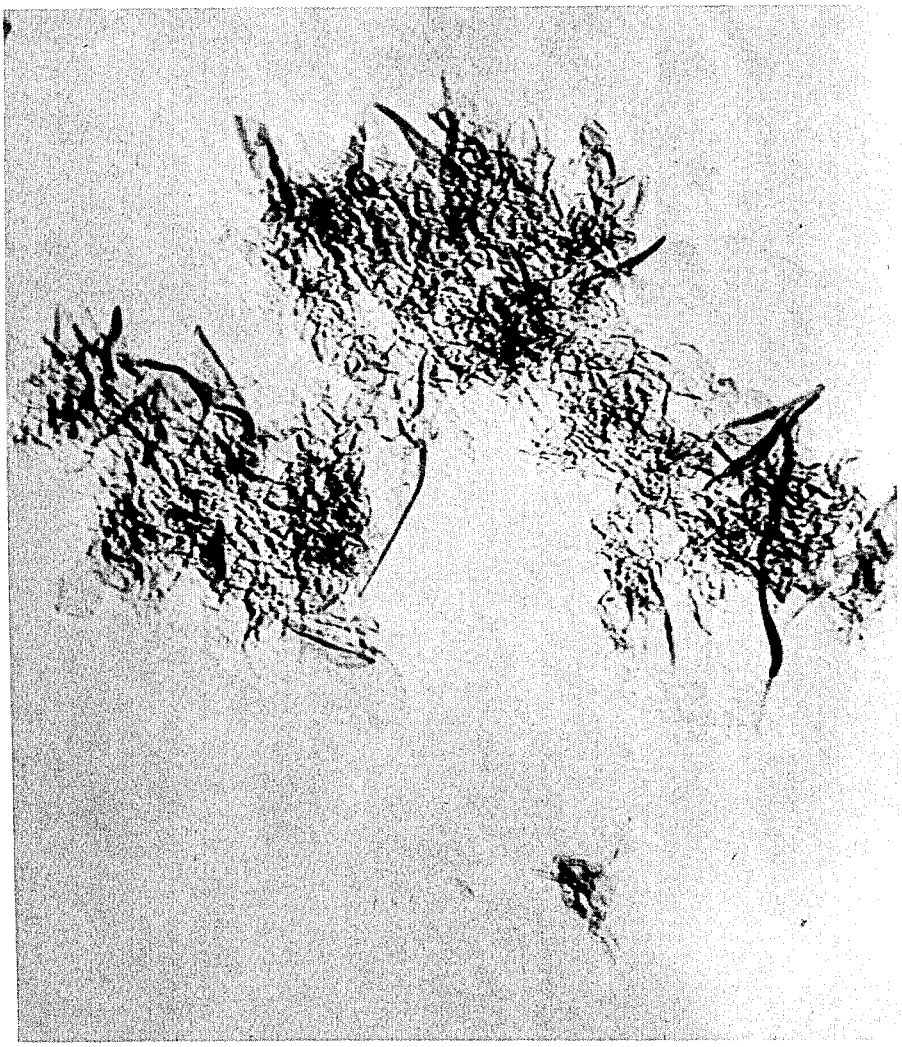
Figure 7:
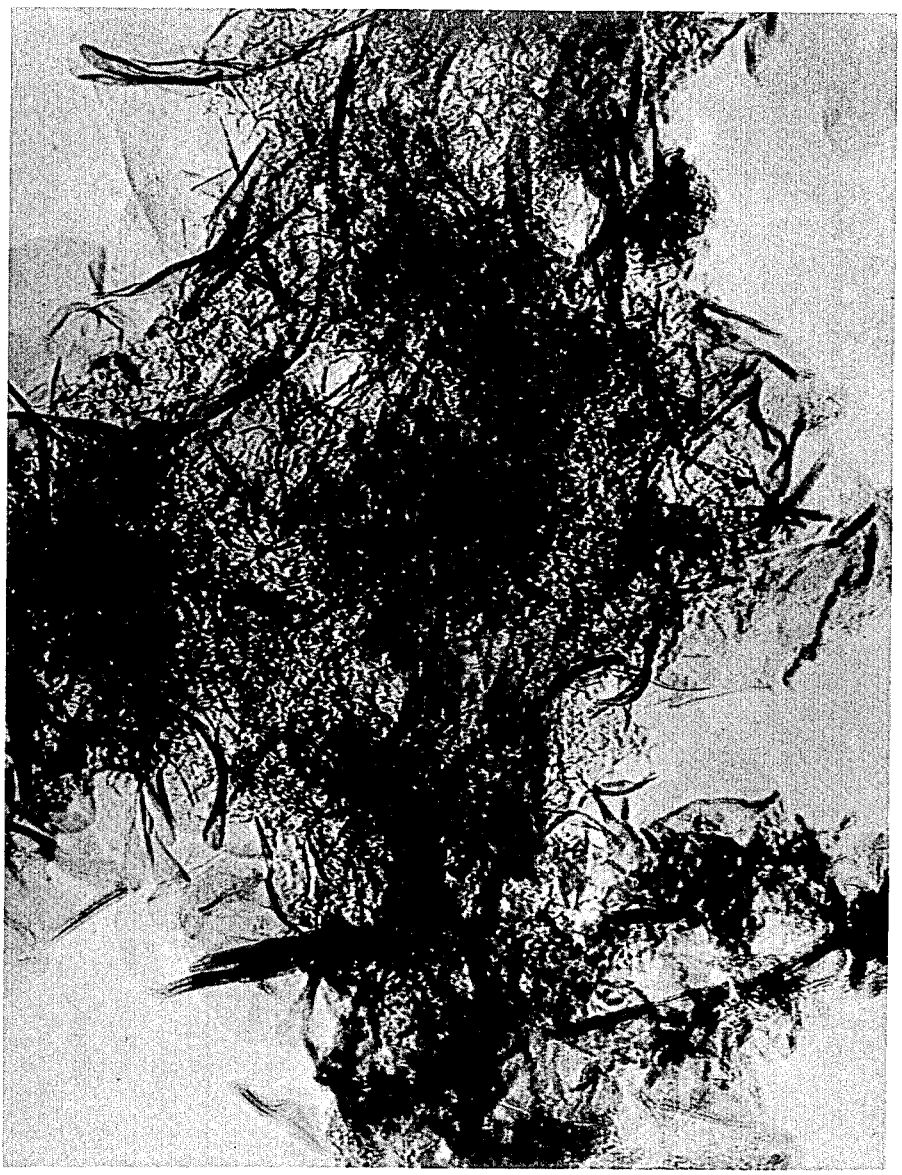
FIG. 7 is a transmission electron micrograph of a catalyst containing $TiCl_4$ impregnated on the alumina aerogel support of FIGS. 6a and 6b.
Figure 8A:
FIGS. 8a and 8b are transmission electron micrographs of an alumina aerogel support prepared in accordance with a preferred embodiment of the method illustrated in FIG. 4C.
Figure 8B:

FIGS. 6a and 6b are electron micrographs (planar views) of a heat-activated alumina aerogel prepared exactly as described in Example 2 hereinbelow and illustrated in FIG. 4B. The samples shown in FIGS. 6a and b were vacuum embedded in MARAGLAS ® epoxy and sectioned with an ultramicrotome and have a morphology consisting of a mixture of spherical particles (having a particle size in the 40–60 Å range) and thin, film-like ribbons and thin plates which as such have folded upon themselves and twisted around one another. FIG. 7 is an electron micrograph of the catalyst prepared by impregnating TiCl$_4$ on the heat-activated alumina aerogel illustrated in FIGS. 6a and 6b. The sample of the catalyst of FIG. 7 was prepared as described for FIGS. 6a and b and has essentially the same morphology as the alumina aerogel supports shown in FIGS. 6a and 6b. FIGS. 8a and 8b are electron micrographs of a heat-activated alumina aerogel prepared exactly as described in Example 3b hereinbelow and illustrated in FIG. 4C. The aerogel shown in FIGS. 8a and 8b was ground between glass plates and dusted onto holey carbon coated grids and has a morphology that consists essentially of thin, film-like platelets having a salt and pepper texture, some of which are folded upon one another and others rolled up in the form of scrolls and is substantially free of spherical particles.

Figure 9A:
FIGS. 9a and 9b are transmission electron micrographs of an alumina aerogel support prepared in accordance with a method similar to that illustrated in FIG. 4D.
Figure 9B:
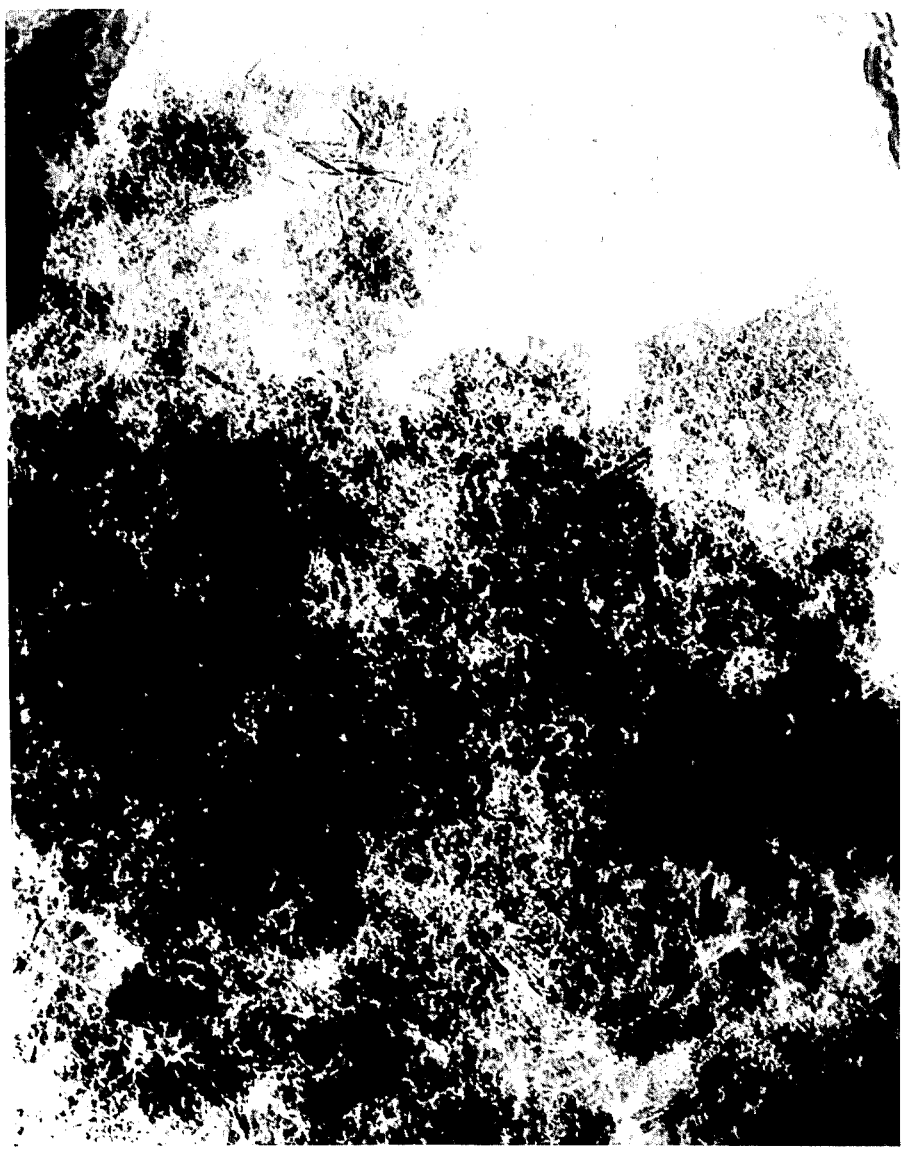
Figure 10A:
FIGS. 10a and 10b are transmission electron micrographs of an alumina aerogel support prepared in accordance with a preferred embodiment of the method illustrated in FIG. 4A.
Figure 10B:

FIGS. 9a and 9b are electron micrographs of a heat-activated alumina prepared exactly as described in Example 4 hereinbelow. The aerogel shown in FIGS. 9a and 9b were prepared for examination by the transmission electron microscope in the manner as described for FIGS. 8a and 8b and have a morphology consisting essentially of spherical clusters of spherical particles having a particle diameter in the 20–40 Å range, substantially free of thin film-like structures. FIGS. 10a and 10b are transmission electron micrographs of an alumina aerogel prepared exactly as described in Example 1 and prepared for examination in exactly the same manner as described for FIGS. 8a and 8b and 9a and 9b. The morphology of the heat-activated alumina aerogel shown in FIGS. 10a and 10b is significantly different than those of FIGS. 5 and 9a and 9b and consists predominately of extremely thin film-like ribbons and plates which as such have folded upon themselves and twisted around one another and some of which are rolled up into scrolls.

Figure 11A:
FIGS. 11a, 11b, 11c and 11d are transmission electron micrographs of an alumina aerogel support prepared in accordance with a preferred embodiment of the method illustrated in FIG. 4E.
Figure 11B:
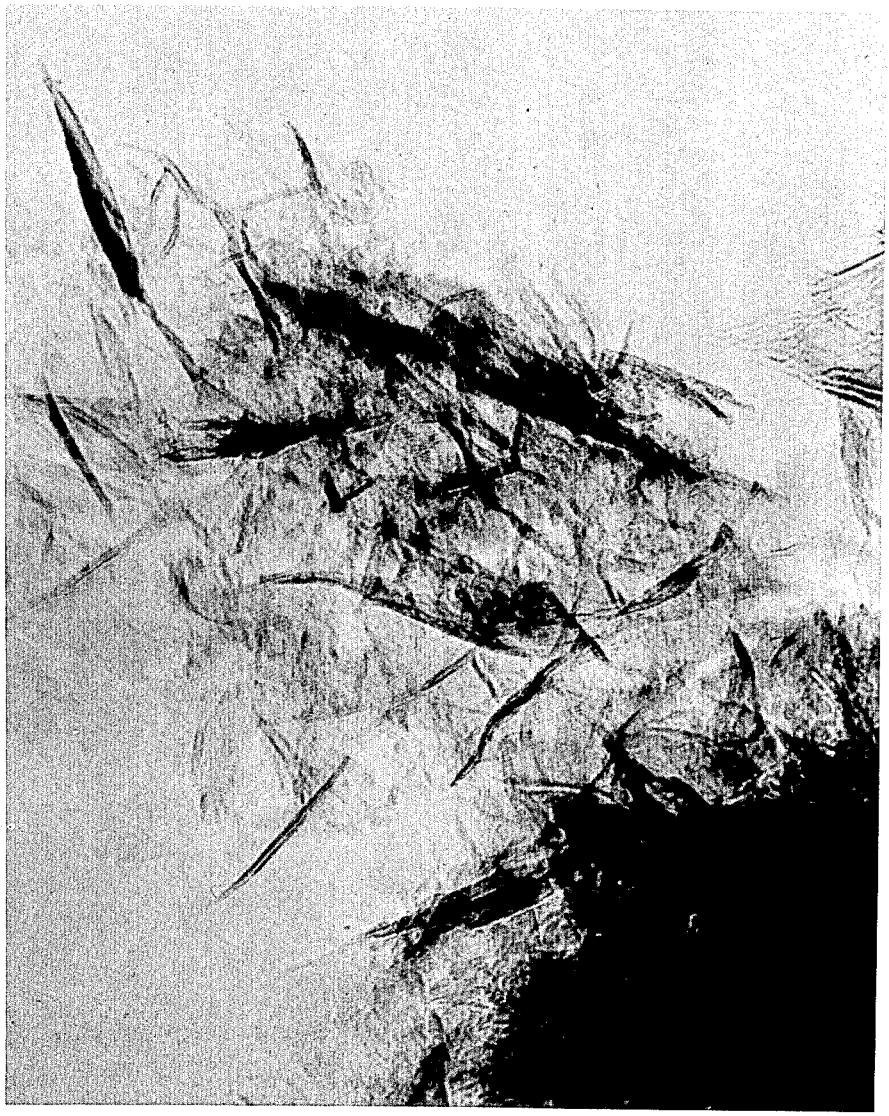
Figure 11C:
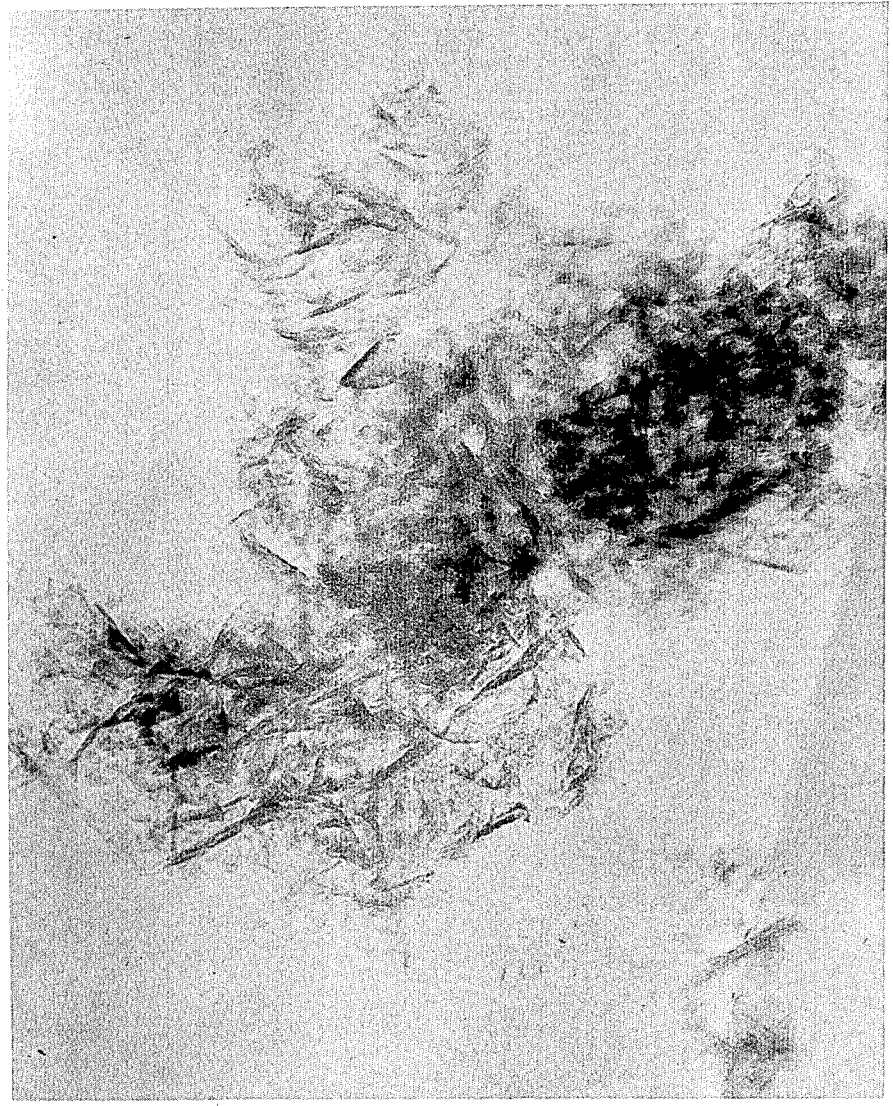
Figure 11D:

FIGS. 11a, 11b, 11c and 11d are electron micrographs of an uncalcined (11a, 11b) and heat-activated alumina aerogels (11c and 11d) prepared as described in Example 5 hereinbelow and illustrated in FIG. 4E. The aerogels shown in FIGS. 11a, 11b, 11c and 11d were prepared for examination by the transmission electron microscope in a manner exactly as described for FIGS. 8a and 8b. No significant difference could be found between the morphology of the uncalcined alumina aerogel shown in FIGS. 11a and 11b and the morphology of the calcined or heat-activated alumina aerogel shown in FIGS. 11c and 11d. The morphologies of the uncalcined alumina-based aerogel shown in FIGS. 11a and 11b and of the heat-activated alumina-based aerogel shown in FIGS. 11c and 11d are almost exactly the same as the morphology of the aerogels shown in FIGS. 8a and 8b and consist essentially of thin film-like textured platelets, some of which are folded upon one another and others of which are rolled up into scrolllike structures and is substantially free of spherical particles. Only the texture of the plates shown in FIGS. 11a to 11d are different from the salt and pepper texture of the plates of FIGS. 8a and 8b.

Figure 12A:
FIGS. 12a and 12b are transmission electron micrographs of a co-aerogel of calcium oxide and alumina prepared as described in Example 21.
Figure 12B:

FIGS. 12a and 12b are electron micrographs of a heat-activated co-aerogel of calcium oxide and alumina prepared as described in Example 21 hereinbelow. The aerogels shown in FIGS. 12a and 12b were prepared for examination by the transmission electron microscope in a manner exactly the same as that described for FIGS. 8a and 8b. The morphology of the heat-activated co-aerogel of calcium oxide and alumina oxide is similar to the morphologies of the aerogels illustrated in FIGS. 8a and 8b and 11a to 11d and consists of a mixture of mainly very thin sheets or plates having a line or fibrous texture and some thin film-like ribbons some of which are folded upon one another and others of which are rolled up into scrolls and is substantially free of spherical particles. Thus, the morphology of the heat-activated co-aerogel of clacium oxide and alumina illustrated in FIGS. 12a and 12b is similar to the morphologies of the heat-activated aerogels illustrated in FIGS. 8a and 8b and in FIGS. 11a, 11b, 11c and 11d, but contains a greater quantity of very thin sheets or plates and less thin film-like ribbons than the morphologies illustrated in FIGS. 8a and 8b and in FIGS. 11a to 11d.

In another aspect of the present invention, the heat-activated alumina-based aerogel comprises mixed metal oxides of at least about 65 wgt % aluminum oxide and up to about 35 wgt %, preferably about 1 to about 15 wgt % of one or more of the aerogels selected from the group consisting of calcium oxide (CaO), barium oxide (BaO), magnesium oxide (MgO), cerium oxide (CeO$_2$), lanthanum oxide (La$_2$O$_3$) titanium oxide (TiO$_2$), zirconium oxide ($ZrO_2$), chromium oxide ($Cr_2O_3$), zinc oxide (ZnO), gallium oxide ($Ga_2O_3$) silica $(SiO_2)_x$ antimony oxide ($Sb_2O_3$) and mixtures thereof. The aerogels considered within the scope of the present invention comprise a heat-activated alumina-based aerogel prepared in accordance with the procedures described in FIGS. 4A–E by hydrolysis of at least about 65 wgt % (basis $Al_2O_3$) a hydrolyzable aluminum compound and up to about 35, preferably about 1 to about 15 wgt % (basis metal oxide) of at least one member selected from the group consisting of hydrolyzable non-aluminum compounds of calcium, barium, magnesium, cerium, lanthanum, titanium, zirconium, chromium, zinc, gallium, silicon and antimony.

Among the hydrolyzable non-aluminum compounds found useful in the process of the present invention are the primary alkyl groups of one to ten carbons, secondary alkyl groups of three to ten carbons and tertiary alkyl groups of four to ten carbons, the primary, secondary and tertiary alkoxides of one to ten carbons, alkanoates of two to eight carbons, nitrates, halides, preferably chloride, and ammonium nitrates of calcium, barium, magnesium, cerium, lanthanum, titanium, zirconium, chromium, zinc, gallium, silicon, antimony and mixtures thereof. Exemplary hydrolyzable non-alumina compounds include $Ca(NO_3)_2.4H_2O$, $Ba(C_9H_{19}CO_2)_2$, $Mg(CH_3CO_2)_2MgCl_2$, $Mg(C_2H_5O)_2$, $Mg(C_6H_{13})_2$, $(NH_4)_2Ce(NO_3)_6$, $LaCl_3.6H_2O$, $La(NO_3)_3.6H_2O$, $Ti(i-C_3H_7O)_4$, $Zr(nC_3H_7O)_4Cr(CH_3CO_2)_3$, $Zn(C_9H_{19}CO_2)_2$, $Ga(sec-C_4H_9O)_4$, $Si(OCH_3)_4$ and $Sb(sec-C_4H_9O)_3$.

(b) Impregnation of the Heat-Activated Alumina-Based Aerogel with a Transition Metal Compound The supported catalyst of the present invention is prepared by contacting the heat-activated alumina aerogel or mixed oxide aerogel, under substantially anhydrous conditions with an effective amount of a transition metal compound formed from a member selected from the group consisting of titanium, vanadium, hafnium and zirconium and of members selected from the group consisting of chlorides, oxychlorides, alkoxychlorides and oxyalkoxychlorides. The catalyst so formed has a BET surface area greater than about 300 $m^2/g$, a pore volume greater than about 3 $cm^3/g$, a bulk density and less than about 0.10 $g/cm^3$ and a Cl to transition metal ratio of no more than 4:1.

Illustrative chloro-transition metal compounds include $TiCl_3$, $TiCl_4$, $Cp_2Ti$, $Cp_2TiCl_2$, $CpTiCl_3$, $VCl_4$, $VOCl_4$, $HfCl_4$, $ZrCl_4$, and the like, wherein Cp is $C_5H_5^-$.

When using transition metal compounds containing alkoxide radicals, they are preferably selected from straight and branched chain alkoxide radicals of 1 to 20 carbon atoms and more preferably, 1 to 10 carbon atoms such as, $TiCl_3(OC_2H_5)$, $TiCl_2(OC_2H_5)_2$, $TiCl(OC_2H_5)_3$ [$Ti(OC_2H_5)_4$ is not preferred]; $TiCl(OC_4H_9)_3$, $TiCl_3(O-i-C_3H_7)$, $VO(O-i-C_4H_9)_3$, $VO(OC_7H_{15})_3$, $HfCl(O-i-C_3H_7)_3$, $HfCl_2(O-i-C_4H_9)_2$, $ZrCl(O-i-C_5H_{11})_3$. Titanium compounds are preferred. The preferred titanium compound is $TiCl_4$.

The amount of transition metal compound, preferably $TiCl_4$, impregnated onto the alumina-based aerogel carrier affects productivity and is critical. While the polymerization support based on a fluorinated carrier such as KETJEN ® NFF, a fluorinated alumina of the prior art, can accept no more than about 1.5 weight percent of titanium, the alumina-based aerogels of the present invention operate as effective carriers without incorporation of fluoride and accordingly may accept and retain a greater quantity of transition metal compounds, such as $TiCl_4$ conveniently about 3–5 weight percent transition metal such as titanium than the fluorinated carriers presently available.

The anhydrous conditions required for the reaction of the alumina-based aerogel and the transition metal compound are critical because of the sensitivity to air and moisture of the transition metal compound. The preferred carrier for the catalyst system of the present invention consists essentially of a heat-activated alumina-based aerogel or co-aerogel that is substantially free of fluorinated alumina.

2. Preparation of the Catalyst System Comprising an Organo-Aluminum Compound and the Catalyst Produced by Reaction of a Transition Metal Compound with the Heat-Activated Alumina-Based Aerogel Support The polymerization and the copolymerization catalyst system of the present invention is formed by the reaction of the transition metal compound on the heat-activated alumina-based aerogel support and an organo-aluminum compound such as $di(C_1-C_{18}alkyl)$ chloroaluminum compound or a $tri(C_1-C_{18}alkyl)$ aluminum compound. The preferred polymerization and copolymerization catalyst system of the present invention incorporates a catalytic amount of a trialkyl aluminum compound preferably a $C_1$ to $C_{12}$ alkyl aluminum compound such as tributylaluminum, triisobutylaluminum, trioctylaluminum, tridecylaluminum, and more preferably, triisobutylaluminum.

The amount of the dialkylchloroaluminum compound or the trialkylaluminum compound is not critical. The molar ratio of organo aluminum compound to the transition metal on the heat-activated aluminabased support is conveniently in the range of about 5:1 to 20:1.

The method of formation of the polymerization and copolymerization catalyst system of the invention is not critical so long as the transition metal compound, e.g., $TiCl_4$, is added to alumina-based aerogel support prior to the addition of the organo-aluminum compound. The organo-aluminum compound and the transition metal compound on the heat-activated alumina-based aerogel support may be reacted either in the presence of the alpha-olefin to be polymerized or the catalyst system may be prepared separately and then introduced into the polymerization reaction medium.

3. The Polymerization and Copolymerization Reaction

The process of the present invention is applicable to the polymerization and copolymerization of alpha-olefins containing from 2 to 18 carbons and preferably containing 2 to 6 carbon atoms such as ethylene, propene, butene-1, cis-and trans-butene-2, isoprene, and hexene-1.

In accordance with the process of the present invention, polymerization and copolymerization of alpha-olefins comprises contacting an alpha-olefin at a temperature and at a pressure sufficient to initiate polymerization and copolymerization with a catalytic amount of an organo-aluminum compound (described herein above) and a catalyst produced by the reaction of a transition metal compound and the heat-activated alumina-based aerogel described hereinabove.

The preferred catalyst of the present invention is formed by contacting $TiCl_4$ with the heat-activated alumina-based aerogel formed in accordance with the preferred embodiments of the preparations described in FIGS. 4A, 4B, 4C and 4E. The preferred olefin of the present invention is ethylene alone or with about 0 to about 10 weight percent of co-monomers of 3-6 carbons such as 1-butene, 1-hexene or the like. The temperature and the pressure for the polymerization of ethylene is at least about 50° C. and a pressure in the convenient range of about 1000 psig. In a preferred aspect of the process of the present invention, the preferred temperature is in the range of about 50° to 100° C. and pressure is in the range of about 450 to 650 psig. The process of the polymerization of ethylene in either preferred aspect of the present invention is effected in the presence of hydrogen. However, the polymerization of ethylene may be effected in the absence of hydrogen. When hydrogen is present, the preferred ratio of the pressure of hydrogen to the pressure of ethylene is in the range of about 0.5:1 to 5:1.

FIG. 1 graphically compares the productivities in the ethylene polymerization reaction employing a catalyst system comprising triisobutyaluminum and $TiCl_4$ on a heat-activated alumina aerogel of the present invention with those of samples of a prior art catalyst based on fluorinated alumina carrier. In a preferred aspect of the present invention, the polymerization process employing the alumina-based aerogel carrier effected polymerization of polyethylene at an hourly productivity of over 3,000 G PE/g cat/hour.

Figure 2:
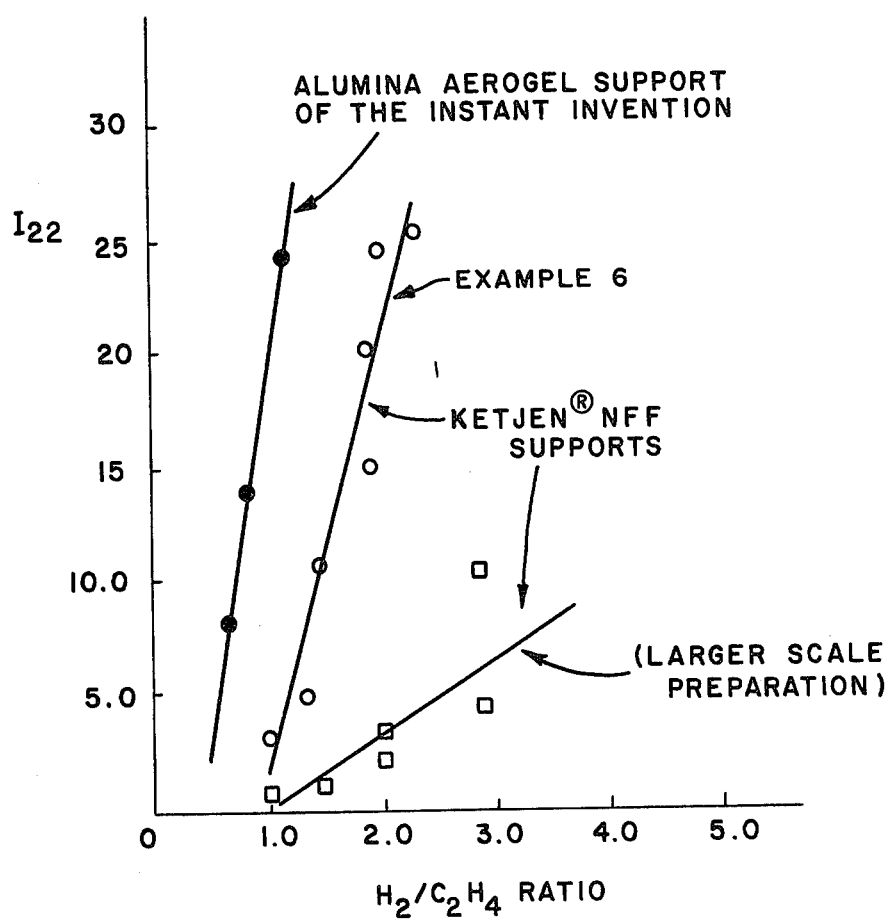
FIG. 2 graphically compares the increase in the High Load Melt Index (I$_{22}$) for polyethylene as a function of the H$_2$/C$_2$H$_4$ ratio for a preferred catalyst system of the present invention and for two samples of polyethylene catalyst based on fluorinated alumina.

In a preferred aspect of the polymerization process to produce polyethylene of a high load melt index ($I_{22}$) equal to about 10, the high productivity for a catalyst employing an alumina-based aerogel carrier produced by the procedure of Example 1 hereinbelow was achieved at a hydrogen to ethylene pressure of about 0.5:1 to less than 1.5:1, preferably 0.75:1 to less than 1.0:1. As illustrated in FIG. 2, polyethylene having a high load melt index of about 10 is produced by using preferred alumina-based aerogel carrier of the present invention, and a hydrogen to ethylene ratio that is less than 1.0 as opposed to ratios of greater than 1.0 required with a prior art catalyst. Operating at a lower hydrogen pressure produces two desirable results. Since a polymerization plant operates at a constant pressure, the ethylene pressure increases as the hydrogen pressure decreases; this results in greater productivity of polyethylene. The second advantage is the reduced loss of ethylene via hydrogenation of the ethylene to ethane.

GENERAL EXPERIMENTAL

A. Apparatus of Polymerization

A 2L autoclave reactor vessel, manufactured by Precision, Inc., was interfaced with an Autoclave Engineers Magna-drive assembly.

The reactants, solvent and purge gas were first passed through three activated treaters in the following order: charcoal, CuO and 4A or 3A (ethylene) molecular sieve. After leaving the treaters, each gas passed through a valve to a gas manifold and then to the reactor.

Positioned directly before the reactor and after the gas manifold was a loop system that allowed catalyst and co-catalyst additions to the reactor vessel. Connected to the loop system by a tee was a stainless steel line from the solvent reservoir. The location of the tee enabled the catalyst/co-catalyst to be carried to the reactor while the solvent was added. To assist solvent delivery, argon pressure was applied to the top of the reservoir at 100 psig (689.11 kPa) above the operating solvent vapor pressure.

B. Procedure for Polymerization: Typical Run

Before the addition of reagents, the atmosphere in the argon purged reactor was analyzed by the Lockwood-McLorie trace oxygen analyzer. The oxygen content was typically less than 1.5 ppm. Then, approximately 500 $cm^3$ of isobutane was transferred to the reactor that was equipped with a water jacket maintained at a temperature of 85° C. The reactor was stirred for 30-45 minutes. The isobutane was then vented and the reactor isolated from the rest of the system. The isobutane venting step was employed to help rid the reactor of traces of air and to condition the vessel before the reagents were introduced. Argon was then used to purge the loop system and the 2.5 $cm^3$ syringe that would be used to introduce the trialkylaluminum compound. With the loop under argon purge, triisobutylaluminum (TiBAL) was added with the syringe through the $\frac{3}{8}''$ (9.5 mm) ball valve and carried to the autoclave reactor with 800 $cm^3$ of isobutane. The loop was again isolated from the reactor, purged again with argon and the catalyst added. The catalyst was carried to the reactor by the remaining 200 mL of isobutane. The reactor at 85° C. was stirred at 520 RPM. At this point the vapor pressure of the solvent was recorded at 1509.4 kPa. The loop was again isolated from the reactor, purged with hydrogen and the hydrogen pressure set in the reactor. At equilibrium temperature (85° C.) and pressure, ethylene was introduced for one hour while maintaining the proper pressure and temperature. At the end of the run the reactor was vented and the product was removed. The reactor was then cleaned and sealed and purged with argon in preparation for the next run.

Example 1 (Catalyst A)

1a. Support Preparation

A suspension consisting of 16.95 g, 0.083 mol aluminum isopropoxide and 95 g methanol was heated at 50° C. in a beaker while being stirred with a magnetic stir bar. Water (4.5 g) was added and the mixture stirred while the temperature was maintained between 50°-70° C. for 67 minutes. The suspension was transferred to a glass test tube and placed into a 300 $cm^3$ stainless steel autoclave. The autoclave was heated without stirring. When the temperature reached 255° C., the gases at 1275 psig (8888 kPa) were vented to the atmosphere over a period of 25 minutes. Five and one-half grams of solid product were recovered. The solid had a BET surface area of 656 $m^2$/g. pore volume (Hg porosimetry) of 5.42 $cm^3$/g, bulk density of 0.057 $g/cm^3$, carbon content of 7.92 wt % and gave an amorphous (with possible Iota and Kappa phases) X-ray pattern. See Tables I an II for a summary of the results.

1b. Calcination or Heat-Activation

Alumina aerogel (1.3 g) prepared as described in 1a was placed in a vertical quartz tube and heated to 700±20° C., over a period of 4 hours and then held at this temperature for an additional 11 hours while 85 $cm^3$/min of oxygen was flowed upwards through the solid. One gram of solid was recovered from the calcination treatment.

1c. Impregnation

The calcined alumina aerogel (0.747 g) of 1b was transferred in a glove box to a 150 mL glass H-reactor for impregnation with $TiCl_4$. The solid in one leg of the H-reactor was contacted with 0.5 mL of a heptane solution containing 0.31 g/cm³ of TiCl₄. The mixture was diluted with additional heptane so that the suspension could be easily stirred with a magnetic stir bar. The suspension was stirred for 1.5 hours at ambient temperature, after which time the solid was filtered within the H-reactor. The solid catalyst was washed once with pure heptane, filtered and maintained under vacuum (10⁻³ mmHg) until dry. A catalyst prepared by the above-described procedures was found by elemental analysis to contain 3.84 wgt% Ti and 11.05 wgt% Cl.

Example 2 (Catalyst B)

The procedures of Example 1 were followed except that a solution was formed from 21.5 g, 0.0874 mol aluminum s-butoxide and 300 g of s-butanol. Precipitation was effected at room temperature using 4.5 g, 0.25 mol of $H_2O$. The mixture was warmed to 75°–80° C. with stirring and then filtered to give 75 g of wet cake. The wet cake was dispersed in 60 g of methanol. Venting, calcination, and impregnation were carried out in accordance with the procedures outlined in Example 1. The physical properties of the alumina aerogel were similar to those of the object of Example 1: 650 m²/g surface area, 5.76 cm³/g pore volume (Hg porosimetry), 0.043 g/cm³ bulk density, 5.8 wt % carbon and an X-ray pattern suggesting mixed amorphous and crystalline phases. After calcination and impregnation (TiCl₄) in accordance with the procedure of Example 1, the catalyst was found by elemental analysis to contain 4.10 wgt% Ti and 11.48 wgt% Cl.

The results are summarized in Tables I and II.

Example 3a (Catalyst C)

Aluminum i-propoxide (16.94 g, 0.083 mol) was heated in 95 g i-propanol. At 70° C. most of the solid dissolved, the solution appearing only slightly cloudy. Addition of 2.25 g $H_2O$ (0.125 mol) caused formation of a milky white precipitate. After about 2 minutes additional stirring, the hot mixture was transferred to the autoclave for venting as described in Example 1 above. The solid, totalling 4.7 g, had a BET surface area of 674 m²/g, pore volume of 4.18 cm³/g, bulk density of 0.07 g/cm³ and carbon content of 1.42 wt % by elemental analysis. Its X-ray diffraction pattern was typical of gamma alumina.

The solid was calcined and impregnated as described in Example 1. The catalyst was analyzed to contain 3.65 wt % Ti and 10.89 wt % Cl.

Example 3b (Catalyst C)

The procedure of 3a was exactly followed except that 4.5 g of $H_2O$ was used in the hydrolysis step. The solid had the following physical properties: a BET surface area of 289 m²/g, a pore volume of 4.3 cm³ g, a bulk density of 0.036 g/cm³ and a carbon content of 1.3 wt. % by elemental analysis. Its X-ray diffraction pattern was typical of Boehmite and unidentified material.

The solid was calcined and impregnated as described in Example 1. The catalyst was used in ethylene polymerization similar to that described in Examples 11 and 12a and 12b. Similar results were obtained.

Example 4 (Catalyst D)

This alumina aerogel was prepared by adding 1.1 g $H_2O$ (0.0611 mol) to a solution of 10 g (0.0406 mol) aluminum s-butoxide in 90 g of s-butanol at ambient temperature. The mixture was vented in accordance with the procedure of Example 1 over a period of 57 minutes while the temperature was maintained between 273°–290° C. The yield amounted to 2.22 g. The alumina had a BET surface area of 404.4 m²/g, pore volume of 4.35 cm³/g (Hg porosimetry) and 0.3 wt % carbon. Its X-ray pattern suggested the presence of a major boehmite phase and a minor amorphous phase.

Calcination and impregnation with TiCl₄ were carried out as described in Example 1 above. Elemental analysis indicated that the catalyst contained 3.2 wt % titanium and 6.1 wt % chlorine.

Example 5(a) (Catalyst E)

This example shows that incorporation of methanol has a beneficial effect on the physical properties of the alumina aerogel and improves the activity of the TiCl₄ impregnated catalyst (compare with catalysts C of Example 3 and E of Example 5(d)).

Aluminum isopropoxide (16.94 g, 0.083 mol) was heated to 70° C., with stirring in 95 g i-proponal in a beaker. When almost all of the solid dissolved, the solution appeared hazy and 4.5 g $H_2O$ was added. The milky white suspension was stirred for two minutes and the hot mixture was transferred to a glass test tube liner with 24 g of methanol and placed into a 300 cm³ SS autoclave for heating and venting in accordance with the procedures as described in Example 1.

The yield of alumina aerogel amounted to 5.12 g. The solid contained 6.48 w% C and 2.97 w% H by elemental analysis and had a BET surface area of 675.4 m²/g, a bulk density of 0.061 g/cm³ and a pore volume of 5.38 cm³ g. The X-ray diffraction pattern indicated the presence of amorphous and possibly iota and kappa phases. After calcination as described in Example 1, the calcined aerogel had a surface area of 466 m²/g and a pore volume of 4.26 cm³/g. See FIGS. 11c and 11d and Table I. The support was impregnated with TiCl₄ as described in Example 1 and used in ethylene polymerization. See Example 14(a) and Table II.

EXAMPLE 5(b) (Catalyst E)

Catalyst Support E was prepared in accordance with procedure of 5(a) on a larger scale using the following procedures. Three hundred twenty-eight grams of i-propanol and 66.2 g (0.325 mol) of aluminum isopropoxide were added directly to a 1 L SS autoclave. After the mixture was stirred for 30 minutes at 70° C. 17.6 g of $H_2O$ was added, causing formation of a thick white precipitate. The mixture was stirred at 70° C. for an additional 15 minutes. The temperature was raised after the addition of 82 g of methanol. When the temperature reached 255° C. (2 h, 5 min) the gases at 1780 psig were super-critically vented down to 1 atm over a period of 1 hour. The product was recovered as a white powder and had a bulk density of 0.031 g/cm³, BET surface area of 456 m²/g and pore volume of 5.38 cm³/g. See FIGS. 11a and 11b and Table II. The catalyst (E) formed after calcination and impregnation with TiCl₄ as described in Example 1 was used for ethylene polymerization. See Example 14(b) and Table II.

Example 5(c) (Catalyst E)

In a procedure completely analagous to Example 5(b) there was obtained 18.2 g of an alumina aerogel in the form of a white powder having the following physical properties: bulk density, 0.030 g/cm³, BET surface area, 495 m²/g and a pore volume of 6.31 cm³/g. (See Table I). After calcination and impregnation with TiCl₄ in accordance with Example 1, Catalyst E was used in ethylene polymerization described in Example 14(c) and Table II.

Comparative Example 5(d) (Catalyst E)

The procedure completely analgous to Example 5(a) was followed except that the solvent composition, in weight percent, was 92% i-propanol and 8% methanol.

Example 6 (KETJEN ®NFF alumina support)

"KETJEN ®NFF" fluorinated alumina (fluoride concentration 2.3 wgt %) was prepared as described in Example 1 of U.S. Pat. No. 3,978,031 and was calcined in nitrogen at 700° C. and impregnated as described in Example 1b and 1c above. An elemental analysis indicated that the catalyst contained 1.33 wt % titanium and 3.69 wt % chlorine.

TABLE I

Physical Properties of Alumina Aerogels

| Example # (Catalyst Designation) | Surface Area ($M^2/g$) | | Pore Volume[2] ($cm^2/g$) | |
|---|---|---|---|---|
| | Before[1] | After[1,3] | Before[1] | After[1,3] |
| Example 1 (A[a]) | 656 | 417 | 5.42 | 5.52 |
| Example 2 (B[b]) | 650 | 498 (501)[3] | 6.83 | 5.38 (6.69)[3] |
| Example 3a (C[c]) | 674 | 340 | 4.18 | 3.52 |
| Example 4 (D[d]) | 404 | 289 (287)[3] | 4.35 | 3.59 (3.12)[3] |
| Example 5a (E[e]) | 675 | 466 | 5.38 | 4.26 |
| Example 5b (E[e]) | 456 | (389)[3] | 5.38 | (4.44)[3] |
| Example 5c (E[e]) | 495 | 364 (348)[3] | 6.31 | 4.17 (4.53)[3] |
| Example 5d (E[d]) | 388 | 341 | 5.62 | 5.79 |
| Example 6 KETJEN ® NFF alumina[f] | 250 | 220 (220)[3] | 1.9 | 1.85 (1.85)[3] |

| Example # (Catalyst Designation) | Bulk Density ($g/cm^3$) | | Carbon Content (wgt %) |
|---|---|---|---|
| | Before[4] | After[4] | Before[5] |
| Example 1 (A[a]) | 0.057 | .095 | 7.92 |
| Example 2 (B[b]) | 0.05 | .073 | 5.56 |
| Example 3a (C[c]) | 0.07 | .128 | 1.42 |
| Example 4 (D[d]) | 0.04 | 0.14 | 0.3[11] |
| Example 5a (E[e]) | 0.061 | 0.104 | 6.48 |
| Example 5b (E[e]) | 0.031 | 0.093 | 1.74 |
| Example 5c (E[e]) | 0.030 | 0.083 | 1.27 |
| Example 5d (E[d]) | 0.037 | 0.08 | 0.61 |
| KETJEN ® NFF alumina[f] | 0.23 | 0.23 | 0.2 |

Footnotes for Table I
[a]Support A: Suspension of $Al(OC(CH_3)_2H)_3$ /$H_2O$/ Methanol; Hydrolysis/super-critical Venting of Methanol and isopropanol (Prepared as described in Example 1)
[b]Support B: Solution of $Al[O-C(H)C_2H_5]_3$ /$H_2O$/ sec-butanol; Hydrolysis; filtration; addition of Methanol; super-critical Venting of Methanol and sec-butanol.
[c]Support C: Solution of $Al[OC(CH_3)_2H]_3$ $H_2O$/i-propanol; Hydrolysis; super-critical venting of i-propanol.
[d]Support D: Solution of $Al(OC(CH_3(H)C_2H_5)_3$ /$H_2O$/ sec-butanol; Hydrolysis; super-critical Venting of sec-butanol.
[e]Support E: Solution of $Al[OC(CH_3)_2H]_3$ in i-propanol; Hydrolysis methanol added to slurry; super-critical venting of i-propanol/MeOH.
[f]Fluoride content of 2.3 wgt %
[1]Before and after calcination at 700° C.
[2]Pore volume was measured by Hg Porosimetry.
[3]While S.A. and P.V. have not been measured on all heat-activated or calcined aerogels after impregnation with $TiCl_4$, the values of S.A. and P.V. listed in Table I, based on limited data available for calcined, alumina aerogels impregnated with $TiCl_4$ in an exact analogous matter to those listed in Table I, are expected to undergo little or no change after impregnation with $TiCl_4$.
[4]Before calcination and after calcination (700° C.) and impregnation with $TiCl_4$.
[5]One alumina aerogel, calcined at 700° C. in $O_2$, was found to contain 0.21 wgt % carbon by elemental analysis. Similar values are to be expected for all alumina aerogels listed in Table I.

Example 7

Ethylene Polymerization with Catalyst A

Ethylene polymerization with catalyst A (prepared as described in Example 1) was carried out in a 2 L SS autoclave in 1 L of isobutane containing 129 mg, 0.65 mmol ($6.5 \times 10^{-4}$ mol) of triisobutylaluminum. The polymerization was carried out at 85° C. and 550 psia, 3790 kPa total pressure, using 121.3 mg. of catalyst A and 11.1 atm of hydrogen. Ethylene was admitted on demand at a constant pressure of 13.0 atm. After 1 hour, the polymerization was stopped and 356.7 g of polyethylene powder were recovered. The hourly productivity was 2941 g.PE/g cat-h and the activity (productivity/atm $C_2H_4$) was 226. The polymer had melt index values of $I_{22}=11.79$ and $I_5=0.82$ (See Table II for a summary of the results of this and similar runs.)

Example 8

Ethylene Polymerization with Catalyst A

A catalyst prepared as described in Example 1 above was also tested for polymerization activity at low pressure. Into a 450 mL glass reactor was charged 41 mg of the solid catalyst A, 225 $cm^3$ of heptane, 71 mg of triisobutylaluminum and 35.4 psia, 244 kPa of hydrogen. Sufficient ethylene at 23.6 psia, 163 kPa was fed on demand to maintain a constant pressure of 465 kPa. The reaction mixture was stirred at 950 rpm and the temperature controlled at 83±3° C. After 1 hour, the run was stopped and the polyethylene was separated and dried; 17.83 g were recovered. The polyethylene had an $I_{22}$ melt index of 0.5 and $I_5$ of 0.02. The activity of catalyst A (g.PE/g cat-hr-atm $C_2H_4$) was 264. (See Table III for a summary of the results of this and similar runs.)

Example 9

Ethylene Polymerization with Catalyst B

The polymerization procedures of Example 7 were followed. A 1 hour run at 11.42 atm pressure of ethylene and 11.30 atm of hydrogen produced 207 g of polyethylene at 85° C. from 68 mg. of the solid catalyst B (preferred as described in Example 2) and 129 mg, 0.65 mmol of triisobutylaluminum. The melt index values of the polymer were $I_{22}=10.4$ and $I_5=0.70$. (See Table II)

Example 10

Ethylene Polymerization with Catalyst B

A low pressure test with a catalyst B, prepared as described in Example 2, gave 27.58 g of polyethylene in 1 hour at 87±3° C. from 73 mg. of solid catalyst B in 225 mL heptane containing 109 mg, 0.55 mmol of triisobutylaluminum. The pressures of ethylene and hydrogen were 22.5 psia, 155 kPa and 33.75 psia, 233 kPa, respectively. The polymer had an $I_{22}$ melt index of 0.12. The activity of catalyst B was 247 g PE/g cat/h/atm $C_2H_4$. (see Table III for a summary of the results.

Example 11

Ethylene Polymerization with Catalyst C

In the 2 L autoclave described above, operating at 85° C., 10.35 atm $H_2$ and 13.8 atm $C_2H_4$, 184 g of polyethylene were obtained in 1 hour from 105.3 mg. of the solid catalyst C (prepared as described in Example 3(a)) with 129 mg, 0.65 mmol of triisobutylaluminum. The polymer had an $I_{22}$ melt index of 7.39 and $I_5$ of 0.46.

Example 12a

Ethylene Polymerization with Catalyst C

The catalyst (C) of Example 3a was tested also at low pressure. The catalyst (43 mg) in conjunction with 64.5 mg, 0.32 mmol of triisobutylaluminum in 255 mL heptane gave 9.78 g of polyethylene in 1 hour at 85±1° C. The pressures of hydrogen and ethylene were 33.75 psia, 232 kPa and 22.5 psia, 155 kPa, respectively. The I22 melt index of the polymer was 2.6 and the I5 value was 0.12.

Example 12b

Ethylene Polymerization with Catalyst C

In a second, low-pressure run with 40 mg. of the same catalyst (C) and 58 mg, 0.29 mmol of triisobutylaluminum, 12.27 g of polyethylene were obtained in 1 hour at 86±1° C., 23.5 psia, 162 kPa of ethylene and 33.25 psia, 229 kPa of hydrogen.

Example 13

Ethylene Polymerization with Catalyst D

Catalyst D, prepared in accordance with Example 4, was tested only at low pressure, 64.7 psia 446 kPa, using 225 mL of heptane, 22.5 psia, 155 kPa of ethylene and 33.75 psia, 233 kPa of hydrogen. Following a 1 hour run at 86±2° C., 9.09 g of polyethylene were obtained from 70 mg. of the solid catalyst (D) and 97 mg, 0.49 mmol of triisobutylaluminum. The $I_{22}$ melt index of the polymer was 3.1 and $I_5$ was 0.10. (See Table III).

Example 14a

Ethylene Polymerization with Catalyst E of Example 5a

Polymerization of ethylene with the $TiCl_4$ impregnated catalyst E prepared as described in Example 5a gave the following results. A productivity of 2994 g PE/g cat-h was obtained in the 2 L autoclave reactor using 126 mg of the catalyst E (Example 5a) 129 mg, $6.5 \times 10^{-4}$ mol of trisobutylaluminum, 12.4 atm $C_2H_4$ and 10.4 atm of $H_2$ in 1 L of isolutane at 85° C. The polymer had an $I_{22}$ melt index of 1.73 and $I_5$ of 0.19. See Table II.

Example 14b

Ethylene Polymerization with Catalyst E of Example 5b

Ethylene polymerization with the $TiCl_4$ impregnated catalyst E of Example 5b yield a productivity of 3160 g PE/g cat-h in the 2 L autoclave reactor using conditions of 12.8 atm $C_2H_4$, 10.2 atm $H_2$ and 1 L of isobutane at 85° C. In this run 108.3 mg of the catalyst E (Example 5b) was used in conjunction with 129 mg ($6.5 \times 10^{-4}$ mol) of triisobutylaluminum. The $I_{22}$ melt index of the polymer was 12.1.

Example 14c

Ethylene Polymerization with Catalyst E of Example 5c

The procedure and apparatus of Example 7 were used. Ninety-nine mg of the $TiCl_4$ impregnated catalyst E prepared as described in Example 5c produced 314 g of polyethylene in 1 hour at 85° C. in 1 L of isobutane in the 2 L autoclave reactor using 129 gm ($6.5 \times 10^{-4}$ mol) of triisobutylaluminum, 12.6 atm $C_2H_4$ and 10.1 atm $H_2$. The polymer had an $I_{22}$ melt index of 8.82. The productivity of the catalyst was 3176 g PE/g cat-h.

Example 14d

Ethylene Polymerization with Catalyst E of Example 5d

The procedure and apparatus of Example 7 were used. A productivity of 2327 g PE/g cat-h was obtained in the 2 L autoclave reactor using 119 mg. of the catalyst E (Example 5d), 129 mg., $6.5 \times 10^{-4}$ mol triisobutylaluminum, 12.3 atm $C_2H_4$ and 10.4 atm of $H_2$ in 1 L of isobutane at 85° C. See Table II.

Example 15a

The polymerization was carried out in the 2 L autoclave described above using 126.8 mg. of the solid KETJEN ® catalyst, prepared as described in Example 6, 1 L of isobutane, 129 mg, 0.65 mmol of triisobutylaluminum, 13.7 atm $H_2$ and 9.82 atm $C_2H_4$. After 1 hour at 85° C., 127.6 g of polyethylene were obtained having an $I_{22}$ melt index of 11.4 and an $I_5$ of 0.616.

Example 15b

In another run with the same KETJEN ® catalyst of Example 14a, 143 g of polyethylene were produced in 1 hour at 85° C. from 124.6 mg of the solid KETJEN ® catalyst, 129 mg of triisobutylaluminum, 9.7 atm, 67 kPa of $C_2H_4$ and 14.45 atm, 100 kPa of $H_2$. The melt indexes of the polymer were $I_{22} = 12.7$ and $I_5 = 0.67$.

Example 16a

Ethylene Polymerization with KETJEN ®NFF

The KETJEN ® catalyst of Example 6 was also tested at low pressure. Using 52 mg. of the solid KETJEN ® catalyst and 33.5 mg, 0.17 mmol of triisobutylaluminum in 225 mL of heptane, a 1-hour run at 86±1° C. produced 10.94 g of polyethylene having an $I_{22}$ melt index of 1.4 and $I_5$ of 0.06. The pressures of hydrogen and ethylene during the run were 19.7 psia, 136 kPa and 39.05 psia, 269 kPa, respectively.

Example 16b

In a run similar to that described in 16a, (except that the pressures of ethylene and hydrogen were 22.5 psia, 155 kPa and 33.75 psia, 232 kPa, respectively) 10.60 g of polyethylene were produced from 39 mg of the solid KETJEN ® catalyst and 25.8 mg of triisobutylaluminum. The $I_{22}$ melt index of the polymer was 0.8 and the $I_5$, 0.04. (See Table III).

TABLE II

Ethylene Polymerization at 85° C. Data for $TiCl_4$-Impregnated Aluminas[a]

| | Catalyst[c] | Pressure (absolute) atm | | Melt Index[d] | |
|---|---|---|---|---|---|
| Support[b] | mg | $H_2$ | $C_2H_4$ | $I_{22}$ | $I_5$ |
| A | 75.5 | 8.20 | 16.70 | 2.60 | 0.17 |
| A | 73.8 | 10.79 | 14.21 | 7.91 | 0.52 |
| A[1] | 121.3 | 11.1 | 13.0 | 11.79 | 0.82 |
| A | 74.6 | 11.23 | 13.86 | 11.8 | 0.77 |
| A | 76.5 | 14.04 | 9.30 | 64.1 | 3.91 |
| B[2] | 68.0 | 11.30 | 11.42 | 10.4 | 0.70 |
| B | 128.0 | 8.71 | 13.07 | 34.5 | 2.0 |
| B | 130.0 | 14.88 | 10.71 | 8.0 | 0.48 |
| C | 129.6 | 14.30 | 9.65 | 60.2 | 3.27 |
| C | 134.5 | 11.54 | 11.54 | 16.55 | 1.09 |
| C[3] | 105.3 | 10.35 | 13.80 | 7.39 | 0.46 |
| E[4a] | 126 | 10.4 | 12.4 | 1.73 | 0.19 |
| E[4b] | 108.3 | 10.2 | 12.8 | 12.1 | |
| E[4c] | 99 | 10.2 | 12.6 | 8.82 | |
| E[4d] | 119 | 10.4 | 12.3 | 14.34 | 0.94 |

TABLE II-continued

Ethylene Polymerization at 85° C. Data for TiCl₄-Impregnated Aluminas[a]

| | | | | | |
|---|---|---|---|---|---|
| KETJEN ® NFF[5] | 124.6 | 14.45 | 9.70 | 12.70 | 0.67 |
| KETJEN ® NFF[6] | 126.8 | 13.70 | 9.82 | 11.4 | 0.62 |
| KETJEN ® NFF[7] | 140.4 | 11.2 | 11.0 | 2.76 | 0.14 |

| Support[b] | PE (g) | Productivity (g PE/g-cat-h) | Activity (Productivity ÷ atm $C_2H_4$) |
|---|---|---|---|
| A | 246 | 3260 | 195 |
| A | 219 | 2976 | 209 |
| A[1] | 356.7 | 2941 | 226 |
| A | 215 | 2883 | 208 |
| A | 140 | 1841 | 185 |
| B[2] | 207 | 3044 | 267 |
| B | 243 | 1898 | 218 |
| B | 252 | 1937 | 130 |
| C | 165 | 1275 | 132 |
| C | 218 | 1626 | 141 |
| C[3] | 184 | 1751 | 127 |
| E[4a] | 377 | 2994 | 241 |
| E[4b] | 342 | 3160 | 247 |
| E[4c] | 314 | 3176 | 252 |
| E[4d] | 277 | 2327 | 189 |
| KETJEN ® NFF[5] | 143 | 1148 | 118 |
| KETJEN ® NFF[6] | 128 | 1006 | 103 |
| KETJEN ® NFF[7] | 180 | 1282 | 117 |

Footnotes for Table II
[a]Supports calcined at 700° C. for 11 hours prior to impregnation.
[b]See Table I for explanation.
[c]129 mg triisobutylaluminum used.
[d]For $I_{22}$, procedure of ASTM D1238, condition F was used. For $I_5$, procedure of ASTM D1238, condition p was used.
[1]Example 7
[2]Example 9
[3]Example 11
[4a-d]Examples 14a, b, c and d, respectively
[5]Example 15b
[6]Example 15a
[7]97 mg triisobutylaluminum used.

TABLE III

Low Pressure Ethylene Polymerization

| Support | Catalyst mg | Triisobutyl-aluminum mg | PE g | Activity g PE/g cat-h/ ÷ atm $C_2H_4$ |
|---|---|---|---|---|
| A[a] | 41[1] | 71 | 17.83 | 264 |
| B[b] | 73[2] | 109 | 27.6 | 247 |
| C[c] | 43[3] | 64.5 | 9.78 | 149 |
| C[c] | 40[4] | 58 | 12.3 | 192 |
| D[d] | 70[5] | 97 | 9.1 | 85 |
| KETJEN ® NFF[e] | 41[6] | 26 | 10.6 | 169 |

| Support | Pressure psia $H_2$ | $C_2H_4$ | Temp. °C. |
|---|---|---|---|
| A[a] | 35.40 | 23.6 | 84 ± 3 |
| B[b] | 33.75 | 22.5 | 88 ± 3 |
| C[c] | 33.75 | 22.5 | 85 ± 1 |
| C[c] | 33.25 | 23.5 | 86 ± 1 |
| D[d] | 33.75 | 22.5 | 85 ± 2 |
| KETJEN ® NFF[e] | 33.75 | 23.0 | 86 ± 1 |

Footnotes for Table III
[a]Support was prepared as described in Example 1.
[b]Support was prepared as described in Example 2.
[c]Support was prepared as described in Example 3a.
[d]Support was prepared as described in Example 4.
[e]Support was prepared as described in Example 6.
[1]Example 8.
[2]Example 10
[3]Example 12a.
[4]Example 12b.
[5]Example 13.
[6]Example 16b

TABLE IV

Morphology of Alumina Aerogels of Examples 1-5 and KETJEN ® NFF

| Example (Catalyst Designation) | X-Ray Diffraction Analysis[1] | Transmission Electron Microscopy[3] |
|---|---|---|
| 1 (A) | Amorphous | Thin Film-like Ribbons and Plates Folded and Rolled into Scrolls. (See FIGS. 10a and 10b) |
| 2 (B) | Amorphous & Crystalline | Mixtures of Thin Film-like Structures and Thin Plates and Spherical Particles See FIGS. 6a and 6b) |
| 3b (C) | Poorly Developed Gamma Alumina | Folded Thin Textured Sheets and Platelets (See FIGS. 8a & 8b) |
| 4 (D) | Boehmite and Amorphous[2] | Spherical clusters of spherical particles (See FIGS. 9a and 9b) |
| 5 (E) | Gamma Alumina | Thin Film-like structures and Plates Folded and Rolled into Scrolls (See FIGS. 11c and 11d) |
| 6 KETJEN ® | Gamma Alumina | Spherical Particles (See FIG. 5) |

[1]After heat-activation at 700° C. in oxygen.
[2]Before heat activation.
[3]See description of FIGS. 5-11 for details.

Example 17

Effects of $H_2SO_4$ addition on the Hydrolysis of Aluminum Isopropoxide in Methanol The procedure described in Example 1 was followed with the following modification. Water (4.05 g) containing 0.41 g conc (98%) $H_2SO_4$ was added to the suspension of aluminum isopropoxide in methanol. All other aspects of support preparation, calcination and impregnation with $TiCl_4$ were the same as described in Example 1.

The following physical properties were measured before calcination: BET surface area=761 m²/g; pore volume=6.14 cm³/g; and bulk density=0.04 g/cm³. Elemental analysis of catalyst (after calcination and impregnation with $TiCl_4$): 1.79 wgt% S; 3.81 wgt% Ti; 10.48 wgt% Cl. It is believed that the use of $H_2SO_4$ in the hydrolysis step favorably affects the gel structure.

EXAMPLE 18

Ethylene polymerization with a catalyst prepared as described in Example 17 was carried out in the apparatus described in Example 7 at 85° C., 550 psia, 3790 kPa total pressure and in the presence of 129 mg triisobutylaluminum. Results are listed in Table V.

TABLE V

Polymerization Data for $TiCl_4$-Impregnated Alumina of Example 17

| Catalyst[a] (mg) | Pressure Absolute (atm) $H_2$ | $C_2H_4$ | PE (g) | Hourly Productivity (g PE/g cat-h) | Activity (Hourly Productivity ÷ atm $C_2H_4$) |
|---|---|---|---|---|---|
| 123 | 10.1 | 12.08 | 438.2 | 3560 | 295 |

TABLE V-continued

Polymerization Data for TiCl4 - Impregnated Alumina of Example 17

| 125 | 11.1 | 11.03 | 394.7 | 3158 | 286 |

| Catalyst[a] | Melt Index | |
|---|---|---|
| (mg) | $I_{22}$ | $I_5$ |
| 123 | 5.73 | .322 |
| 125 | 9.61 | .543 |

[a]TiCl4 impregnated alumina prepared as described in Example 17.

Comparative Examples 19

Low pressure polymerizations of ethylene were conducted in 450 mL glass reactors in accordance with the procedure described in Example 8, with various aluminas impregnated with TiCl4: The non-fluorinated aluminas were prepared by hydrolysis of aluminum secbutoxide in the solvents indicated, followed by removal of solvent under non-supercritical (non-vented) or supercritical (vented) conditions. The fluorinated aluminas were prepared by inclusion of an appropriate quantity of HF or NH4F in the reaction mixture in the autoclave prior to supercritical venting of the solvents. The results are summarized in Table VI.

TABLE VI

Low Pressure Ethylene Polymerization Data for Various TiCl4 - Impregnated Alumina Catalysts

| Support[b,d] Type | Activity[c] Per g cat | Activity[c] Per g Ti | Bulk Density[d] (g/cm³) |
|---|---|---|---|
| KETJEN ® NFF[1] | 84.0 | 4000 | .23 |
| Aerogel (V-B-M)[2] | 236.0 | 5900 | .073 |
| Aerogel (V-B-M-F)[3] | 161.0 | 5031 | .10 |
| Aerogel (V-B-B)[4] | 84.8 | 2650 | .14 |
| Xerogel (NV-B-B-F)[5] | 37.8 | 1189 | .48 |
| Aerogel (V-B-B)[6] | 34.3 | 1319 | .25 |
| Hybrid[7] | 15.5 | 686 | .32 |
| Aerogel (V-M-M-F)[8] | 13.8 | 750 | .69 |
| Aerogel (V-B-B)[9] | 8.69 | — | .39 |
| Fumed[10] | 1.40 | 98 | .40 |
| CATAPAL SB[11] | 1.00 | 42 | — |

| Support[b,d] Type | Pore Volume[dc] (cm³/g) | Surface Area[df] (m²/g) |
|---|---|---|
| KETJEN ® NFF[1] | 1.85 | 220 |
| Aerogel (V-B-M)[2] | 6.69 | 501 |
| Aerogel (V-B-M-F)[3] | 4.54 | 335 |
| Aerogel (V-B-B)[4] | 3.12 | 287 |
| Xerogel (NV-B-B-F)[5] | 2.13 | 367 |
| Aerogel (V-B-B)[6] | 2.67 | 228 |
| Hybrid[7] | — | — |
| Aerogel (V-M-M-F)[8] | 1.73 | 171 |
| Aerogel (V-B-B)[9] | 1.83 | 277 |
| Fumed[10] | 3.23 | 103 |
| CATAPAL SB[11] | — | — |

Footnotes for Table VI
[a]Low Pressure Ethylene Polymerization in 450 mL glass reactor at standard conditions: 85° C.; 22.5 psia C2H4; 33.75 psia H2.
[b]Catalyst support prepared as described below impregnated with TiCl4.
[c]Activity in g of PE/h/atm of C2H4.
[d]Quantity measured on calcined (700° C.) catalyst after impregnation with TiCl4.
[e]Hg Porosimetry.
[f]BET Surface Area.
[g]The abbreviation: V = Vented; NV-Nonvented; B = sec-butanol; M-Methanol; F = Fluoride. The sequence, e.g., V-B-M or NV-B-B-F refers to conditions of solvent removal: V-(supercritical venting of solvent), NV-(hypocritical venting of solvent). The second letter, e.g., B is the first letter of the name of the solvent, e.g., butanol used in hydrolysis step; The third letter, e.g., M is the first letter of the solvent, e.g., methanol used in venting or non-venting step; The presence of fluorine indicated by F. Nonvented materials are materials prepared without removal of the solvent under supercritical conditions.
[1]KETJEN ® NFF - fluorinated alumina (2.3 wgt % F) prepared as described in Example 1 of U.S. Pat. No. 3,978,031 and treated as described in instant Example 6.
[2]Al(O—secBu)3/sec BuOH/H2O; filter; methanol added to wet filter cake supercritical venting of methanol. (See Example 2)
[3]Same as in Footnote 2 except that aerogel was fluorinated (2.7 wgt % F).
[4]Al(O—secBu)3/sec BuOH/H2O; supercritical venting of sec BuOH. (See Example 4)
[5]Al(O—secBu)3/sec-BuOH/H2O/nonsupercritical removal of secBuOH; xerogel fluorinated with NH4F (2.0 wgt % F).
[6]Prepared as described in Footnote 4.
[7]Al(O secBu)3/H2O; filter; methanol added to wet filter cake; supercritical venting of methanol Pore Volume = 2.95 cm³/g (before impregnation); SA = 282 m²/g (before impregnation).
[8]Al(Osec Bu)3/MeOH/NH4F/H2O: supercritical venting of methanol; fluorinated aerogel contained 3.2 wgt % F.
[9]Prepared as described in Footnote 4. No impregnation with TiCl4.
[10]Fumed alumina obtained from Degussa Corp.
[11]Obtained from Conoco; before impregnation with TiCl4, Bulk Density = 0.70 g/cm³; Pore Volume = 0.57 cm³/g; Surface Area = 227 m²/g.

Figure 3A:
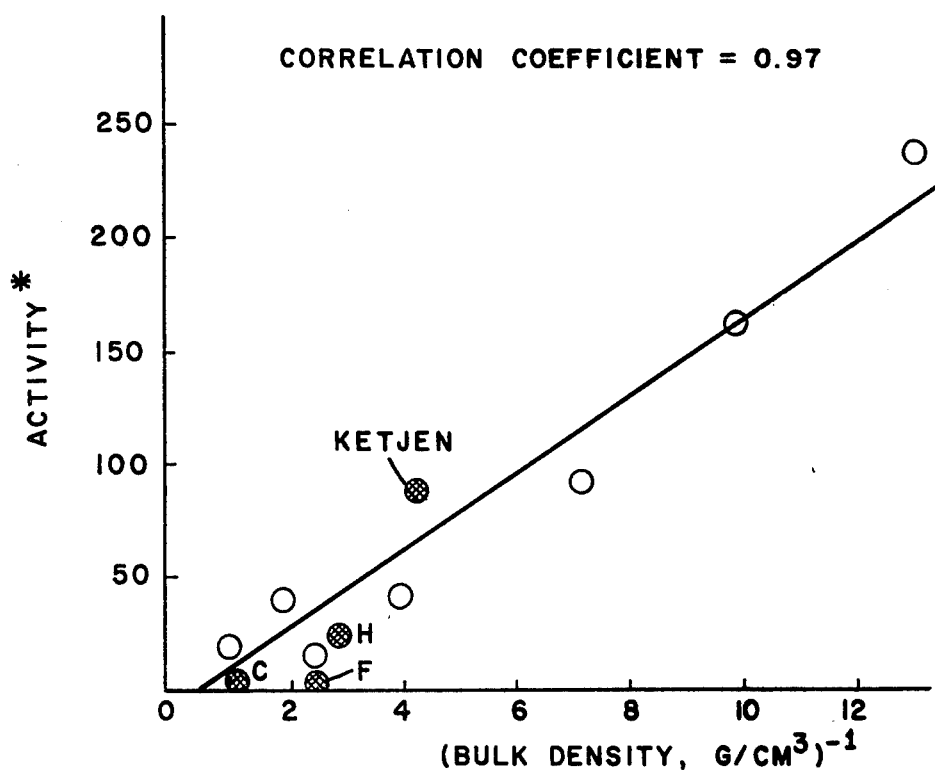
FIGS. 3A, 3B and 3C graphically compare the variation of activity in an ethylene polymerization with, respectively, the reciprocal of the bulk density, the pore volume and the BET surface area for TiCl$_4$ supported on heat-activated alumina-based aerogels with various prior art catalysts and catalysts formed from commercially available aluminas.
Figure 3B:
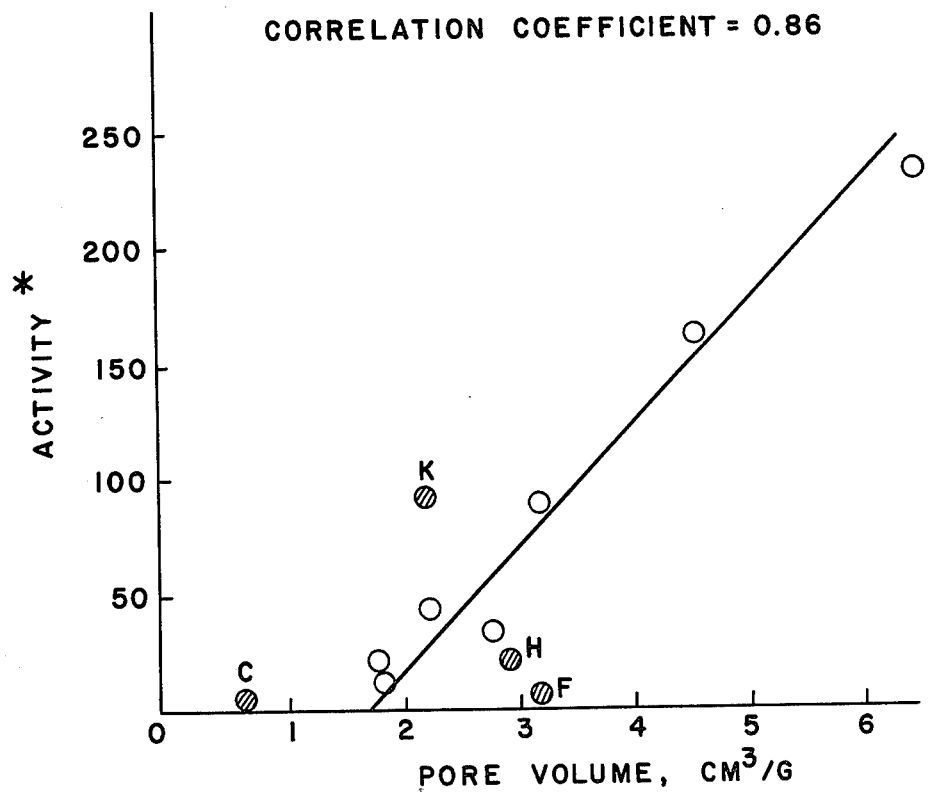
Figure 3C:
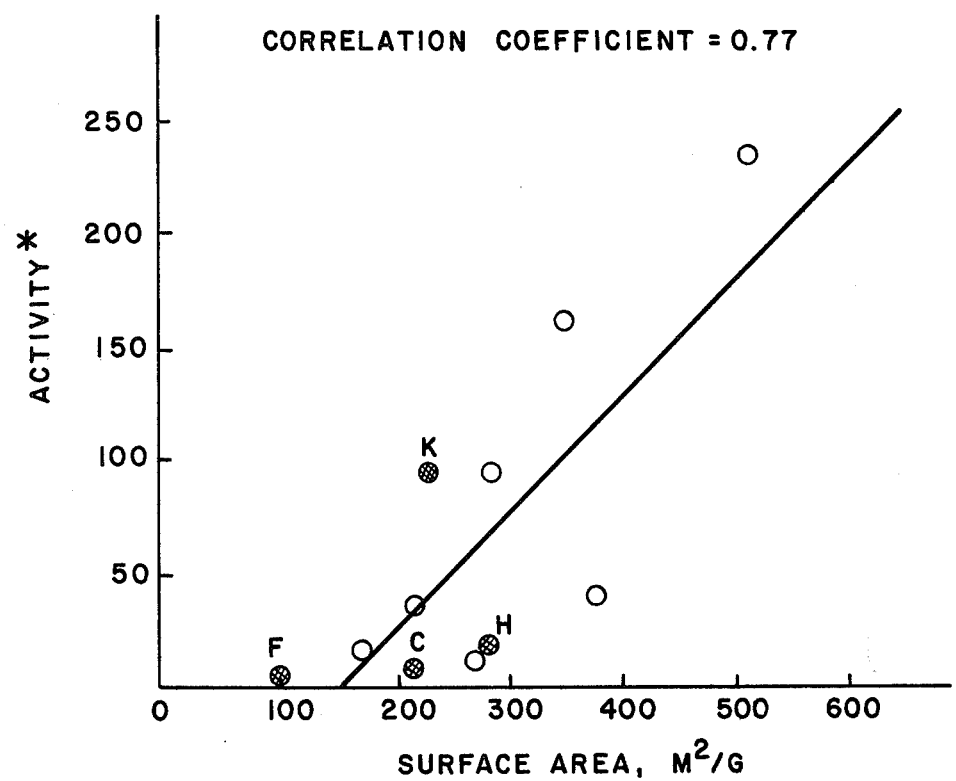

Data selected from Table VI is graphically displayed in FIGS. 3A, 3B and 3C for the following TiCl4-impregnated alumina catalysts: the open circles represent data for alumina-based aerogel catalysts, and the filled circles represent data for the following non-aerogel alumina-based catalysts: C represents data for CATAPAL SB; F represents data for fumed alumina; H represents data for the hybrid alumina catalyst prepared as described in Footnote 7 of Table VI; and K represents data for KETJEN ® NFF. The activity data illustrated in FIGS. 3A, 3B and 3C pertains to ethylene polymerization data obtained in the apparatus of Example 19 at a nominal total pressure of 65 psia with the various above-identified TiCl4-impregnated alumina catalysts. The physical properties plotted versus activity in FIGS. 3A, 3B and 3C were determined as follows: bulk densities were measured after TiCl4 impregnation; pore volumes were measured before calcination; and BET surface areas were measured before calcination. Based on the increase (by a factor of about 10) in the bulk density for fumed alumina after TiCl4 impregnation, it is believed that the pore volume for fumed alumina after calcination and TiCl4 impregnation would be less than about 3 cm³/g.

Example 20

Preparation of a Sb/Al co-aerogel was conducted, as described in Example 2, with the following modification. A solution was formed from 0.42 g, 1.23 mmol of antimony tri(sec-butoxide), 18.31 g, 0.0744 mol of aluminum tri(sec-butoxide), 400 g of sec-butanol, and 8.3 g of H2O was added, with stirring, to effect precipitation and the mixture so formed was heated to 75° C. The mixture was allowed to cool to room temperature and filtered to give a wet cake that was dispersed in about 85 g of methanol. Super-critical venting of solvent from the co-aerogel was conducted as described in Example 1. The following physical properties of the recovered co-aerogel (4.54 g) were measured: bulk density was 0.05 g/cm$^3$; BET surface area was 485.4 m$^2$/g; pore volume (Hg) was 4.74 cm$^3$/g; elemental analysis: 30.8% Al; 2.89% Sb; 6.78%C; 2.96%H. x-ray analysis showed the following morphology: amorphous phase plus aluminum hydroxide methoxide. The physical properties after calcination at 700° C. (O$_2$) and impregnation with TiCl$_4$ are listed in Table VII.

Example 21

The preparation of a Ca/Al co-aerogel was conducted as described in Example 20 with the following modifications. A solution was formed from 18.32 g, 0.0745 mol of aluminum tri(sec-butoxide) and 400 g of sec-butanol. Precipitation was effected, with stirring, at room temperature by addition of 8 mL of an aqueous solution containing 0.89 g, 3.77 mmol of Ca (NO$_3$)$_2$ 4H$_2$O and 0.7 g (NH$_4$)$_2$ CO$_3$.

The wet cake was filtered, dispersed in about 85 g of methanol, and the methanol was super-critically vented as described in Example 20. The following physical properties of the Ca/Al co-aerogel were measured: bulk density 0.045 g/cm$^3$; BET surface area 389 m$^2$/g; pore volume (Hg) 5.8 cm$^3$/g elemental analysis 32.45% Al; 1.62% Ca; 6.57%C; 2.6%H. The X-ray pattern suggested the presence of an amorphous phase plus aluminum hydroxide methoxide. The physical properties after calcination at 700° C. (O$_2$) and impregnation with TiCl$_4$ are listed in Table VII.

Example 22

The procedures of Example 21 were followed except that 0.54 g of gallium tri(sec-butoxide) was dissolved in the 8 g of deionized water that was used for hydrolysis of the aluminum tri(sec-butoxide). Solid amounting to 4.58 g, having a bulk density of 0.03 g/cm$^3$ was isolated. The X-ray pattern indicated the presence of amorphous and aluminum hydroxide methoxide components. The surface area and pore volume were 7/8 cm$^2$/g (BET) and 5.14 cm$^3$/g (Hg porosimetry), respectively, Elemental Anal: (w%): 1.49 Ga, 30.25 Al, 7.8C, 2.84H.

TABLE VII

Activity in Low Pressure Ethylene Polymerization
Physical Properties for Alumina Cogel
Catalysts Impregnated with TiCl$_4$

| Catalyst[a] Support | Bulk Density[b] (g/cm$^3$) | Pore Volume[c] (cm$^3$/g) |
|---|---|---|
| Al$_2$O$_3$ aerogel of Example 2 | .05 | 5.38 |
| Sb$_2$O$_3$/Al$_2$O$_3$ Aerogel of Ex. 20 | .052 | 6.08 |
| CaO/Al$_2$O$_3$ Aerogel of Ex. 21 | .045 | 7.8 |
| Ga$_2$O$_3$/Al$_2$O$_3$ Aerogel of Ex. 22 | .03 | 4.85 |

| Catalyst[a] Support | Surface Area (m$^2$/g) | Activity (g PE/g cat/h/atm C$_2$H$_4$) |
|---|---|---|
| Al$_2$O$_3$ aerogel of Example 2 | 498 | 236[d] |
| Sb$_2$O$_3$/Al$_2$O$_3$ Aerogel of Ex. 20 | 440 | 289.5[e] |
| CaO/Al$_2$O$_3$ Aerogel of Ex. 21 | 409 | 250 |
| Ga$_2$O$_3$/Al$_2$O$_3$ Aerogel of Ex. 22 | 472 | 235[f] |

Footnotes for Table VII
[a] Low Pressure Ethylene Polymerization at 85° C., 22.5 psia, 155 kPa of C$_2$H$_4$ and 33.75 psia, 232 kPa of H$_2$ in 225 mL heptane and with triisobutylaluminum.
[b] Bulk Density measured before calcination at 700° C. in O$_2$.
[c] Valves for Pore Volume and BET Surface Area measured after calcination at 700° C. in O$_2$.
[d] Average of two runs having activities of 224 and 247 conditions: 85° C., 22.5 psia, 155 kPa C$_2$H$_4$ and 33.75 psia, 232 kPa H$_2$.
[e] Average of two runs having activity = 284 and 295.
[f] Average of two runs having activities of 248 and 222 conditions: 85° C., 22.5 psia, 155 kPa C$_2$H$_4$ and 33.75 psia, 232 kPa H$_2$.

Example 23

The following aerogels are prepared in accordance with the procedures of Examples 20-22, excepting that 5 mole percent of the hydrolyzable non-alumina compound listed in Column B is added to 95 mole percent of the hydrolyzable aluminum compound listed in Column A in the solvent indicated. Supercritical venting is from methanol.

| Column A | Column B | Solvent |
|---|---|---|
| Al(iC$_3$H$_7$O)$_3$ | Mg(CH$_3$CO$_2$)$_2$ | isopropanol |
| Al(iC$_3$H$_7$O)$_3$ | Mg Cl$_2$ | isopropanol |
| Al(iC$_3$H$_7$O)$_3$ | Mg(C$_2$H$_5$O)$_2$ | isopropanol |
| Al(iC$_3$H$_7$O)$_3$ | Mg(C$_6$H$_{13}$)$_2$ | isopropanol |
| Al(iC$_3$H$_7$O)$_3$ | Si(OCH$_3$)$_4$ | isopropanol |
| Al(iC$_3$H$_7$O)$_3$ | Zn(C$_9$H$_{19}$CO$_2$)$_2$ | isopropanol |
| Al(iC$_3$H$_7$O)$_3$ | Zr(n-C$_3$H$_7$O)$_4$ | isopropanol |
| Al(iC$_3$H$_7$O)$_3$ | Cr(CH$_3$CO$_2$)$_3$ | isopropanol |
| Al(iC$_3$H$_7$O)$_3$ | Ba(C$_9$H$_{19}$CO$_2$)$_2$ | isopropanol |
| Al(iC$_3$H$_7$O)$_3$ | (NH$_4$)$_2$Ce(NO$_3$)$_6$ | isopropanol |
| Al(iC$_3$H$_7$O)$_3$ | La(NO$_3$)$_3$ 6H$_2$O | isopropanol |
| Al(iC$_3$H$_7$O)$_3$ | LaCl$_3$ 6H$_2$O | isopropanol |
| Al(iC$_3$H$_7$O)$_3$ | Ti(i-C$_3$H$_7$O)$_4$ | isopropanol |
| Al(sec-C$_4$H$_9$O)$_3$ | Mg(CH$_3$CO$_2$)$_2$ | sec-butanol |
| Al(sec-C$_4$H$_9$O)$_3$ | Mg Cl$_2$ | sec-butanol |
| Al(sec-C$_4$H$_9$O)$_3$ | Mg(C$_2$H$_5$O)$_2$ | sec-butanol |
| Al(sec-C$_4$H$_9$O)$_3$ | Mg(C$_6$H$_{13}$)$_2$ | sec-butanol |
| Al(sec-C$_4$H$_9$O)$_3$ | Si(OCH$_3$)$_4$ | sec-butanol |
| Al(sec-C$_4$H$_9$O)$_3$ | Zn(C$_9$H$_{19}$CO$_2$)$_2$ | sec-butanol |
| Al(sec-C$_4$H$_9$O)$_3$ | Zr(n-C$_3$H$_7$O)$_4$ | sec-butanol |
| Al(sec-C$_4$H$_9$O)$_3$ | Cr(CH$_3$CO$_2$)$_3$ | sec-butanol |
| Al(sec-C$_4$H$_9$O)$_3$ | Ba(C$_9$H$_{19}$CO$_2$)$_2$ | sec-butanol |
| Al(sec-C$_4$H$_9$O)$_3$ | (NH$_4$)$_2$ Ce(NO$_3$)$_6$ | sec-butanol |
| Al(sec-C$_4$H$_9$O)$_3$ | La(NO$_3$)$_3$ 6H$_2$O | sec-butanol |
| Al(sec-C$_4$H$_9$O)$_3$ | LaCl$_3$ 6H$_2$O | sec-butanol |
| Al(sec-C$_4$H$_9$O)$_3$ | Ti(i-C$_3$H$_7$O)$_4$ | sec-butanol |

The aerogels so formed are calcined and impregnated with TiCl$_4$ as described in Example 2 to form catalysts useful for polymerization of ethylene. Physical properties and activities of these catalysts are expected to be similar to those listed in Table VII.

Example 24

The procedure of Example 23 is followed excepting that 15 weight percent (based on metal oxide) of materials listed in Column B and 85 weight percent (based on Al$_2$O$_3$) of materials listed in Column A are used. Similar results are expected.

Example 25

The procedure of Example 23 is followed excepting that 35 weight percent (based on metal oxide) of materials listed in Column B and 65 weight percent (based on Al$_2$O$_3$) of materials listed in Column A are used. Similar results are expected.

What is claimed is:

1. A process for the polymerization and copolymerization of alpha-olefins which comprises contacting an alpha-olefin at a temperature and at a pressure sufficient to initiate the polymerization and copolymerization with a catalytic amount of
   (a) a di($C_1$-$C_{18}$ alkyl) chloroaluminum compound or a tri($C_1$-$C_{18}$alkyl) aluminum compound; and
   (b) a catalyst produced by the reaction of a transition metal compound formed from members selected from the group consisting of titanium, vanadium, hafnium, and zirconium and from members selected from the group consisting of chlorides, oxychlorides, alkoxychlorides and oxyalkoxychlorides with a heat-activated alumina based aerogel having a morphology by transmission electron microscopy comprising thin film-like structures and having a bulk density less than about 0.10 g/cm$^3$, a BET surface area greater than about 300 m$^2$/g and a pore volume greater than about 3 cm$^3$/g and obtained by heating an alumina-based aerogel having a carbon content at a temperature of at least about 400° C., in the presence of oxygen, for a time sufficient to produce said heat activated alumina-based aerogel substantially free of carbon; said alumina-based aerogel being prepared by venting a $C_1$-$C_5$ alcohol or mixture of same, under supercritical conditions, from a mixture comprising a hydrolyzable aluminum compound, water, and a $C_1$-$C_5$ alcohol.

2. The process of claim 1 wherein the alumina-based aerogel is prepared by (a) forming a solution or suspension comprising an alcohol or mixture of alcohols selected from $C_1$-$C_5$ alcohol and a hydrolyzable aluminum compound and at least about a stoichiometric amount of water required to hydrolyze said hydrolyzable aluminum compound; (b) heating the suspension or solution so formed in the presence of a $C_1$-$C_5$ alcohol or mixture of same to a temperature above the critical temperature of said alcohol or said mixture; and (c) removing said alcohol or mixture of same under supercritical conditions to form an alumina-based aerogel having a carbon content greater than about 1 weight percent.

3. The process of claim 2 wherein the solution or suspension formed in step (a) comprises at least about 65 weight percent (basis Al$_2$O$_3$) of a hydrolyzable aluminum compound and up to about 35 weight percent (basis metal oxide) of at least one member selected from the group consisting of hydrolyzable compounds of calcium, barium, magnesium, cerium, lanthanum, titanium, zirconium, chromium, zinc, gallium, silicon and antimony.

4. The process of claim 2 wherein the alumina-based aerogel is prepared by forming a suspension in the step (a) and wherein the $C_1$-$C_5$ alcohol used in step (b) is methanol and wherein the carbon content of the alumina aerogel formed in step (c) is at least about 1-8 weight percent.

5. The process of claim 4 wherein the alcohol in steps (a) and (b) is methanol and wherein the carbon content of the alumina-based aerogel formed is at least about 1-8 weight percent.

6. The process of claim 2 wherein a solution of aluminum isopropoxide in isopropanol is formed in step (a) and wherein in step (b) methanol is added to the suspension formed in step (a) and wherein in step (c) methanol and isopropanol are removed.

7. The process of claim 1 wherein the transition metal compound is TiCl$_4$ and the ratio of Cl to Ti in the catalyst is no more than 4:1.

8. The process of claim 1 wherein the alpha-olefin is ethylene.

9. The process of claims 1 or 7 wherein the heat-activated alumina-based aerogel of the catalyst is substantially free of fluorinated alumina.

10. The process of claim 8 wherein the temperature is from about 50° C. to about 100° C. and the pressure is from about 450 to 650 psig.

11. The process of claim 8 wherein the polymerization and copolymerization are effected in the absence of hydrogen.

12. The process of claim 8 wherein the polymerization and copolymerization are effected in the presence of hydrogen.

13. The process of claim 12 wherein the ratio of the pressure of hydrogen to the pressure of ethylene is in the range of about 0.5:1 to about 5:1.

14. The process of claim 12 wherein the ratio of the pressure of hydrogen to the pressure of ethylene is in the range of about 0.5:1 to less than about 1.5:1.

15. The process of claim 12 wherein the ratio of the pressure of hydrogen to the pressure of ethylene is in the range of about 0.75:1 to less than about 1.0:1.

16. The process of claim 1 wherein the alpha olefins ethylene and wherein the temperature is at least about 50° C. and a pressure in the range of about 1000 psig.

* * * * *